United States Patent
Sankaranarayanan et al.

(10) Patent No.: US 12,554,502 B2
(45) Date of Patent: *Feb. 17, 2026

(54) METHOD FOR PERFORMING RANDOM READ ACCESS TO A BLOCK OF DATA USING PARALLEL LUT READ INSTRUCTION IN VECTOR PROCESSORS

(71) Applicant: TEXAS INSTRUMENTS INCORPORATED, Dallas, TX (US)

(72) Inventors: Jayasree Sankaranarayanan, Kerala (IN); Dipan Kumar Mandal, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/754,455

(22) Filed: Jun. 26, 2024

(65) Prior Publication Data

US 2024/0345842 A1    Oct. 17, 2024

Related U.S. Application Data

(63) Continuation of application No. 18/321,037, filed on May 22, 2023, now Pat. No. 12,056,491, which is a (Continued)

(30) Foreign Application Priority Data

Nov. 3, 2014    (IN) .................. 5509/CHE/2014

(51) Int. Cl.
  *G06F 9/38*    (2018.01)
  *G06F 9/30*    (2018.01)
(52) U.S. Cl.
  CPC .......... *G06F 9/383* (2013.01); *G06F 9/30036* (2013.01); *G06F 9/30038* (2023.08); *G06F 9/3004* (2013.01); *G06F 9/30043* (2013.01)

(58) Field of Classification Search
  CPC ............ G06F 9/30036; G06F 9/30038; G06F 9/3004; G06F 9/30043; G06F 9/383
  See application file for complete search history.

(56) References Cited

U.S. PATENT DOCUMENTS 6,606,686 B1    8/2003  Agarwala
6,963,341 B1   11/2005  Mimar
(Continued)

OTHER PUBLICATIONS

E. Rosten and T. Drummond, "Machine Learning for High Speed Corner Detection", Computer Vision—ECCV 2006, Lecture Notes in Computer Science, vol. 3951, 2006, pp. 430-443.

(Continued)

*Primary Examiner* — Larry T Mackall
(74) *Attorney, Agent, or Firm* — Michelle Murray; Frank D. Cimino

(57) ABSTRACT

This disclosure is directed to the problem of paralleling random read access within a reasonably sized block of data for a vector SIMD processor. The invention sets up plural parallel look up tables, moves data from main memory to each plural parallel look up table and then employs a look up table read instruction to simultaneously move data from each parallel look up table to a corresponding part a vector destination register. This enables data processing by vector single instruction multiple data (SIMD) operations. This vector destination register load can be repeated if the tables store more used data. New data can be loaded into the original tables if appropriate. A level one memory is preferably partitioned as part data cache and part directly addressable memory. The look up table memory is stored in the directly addressable memory.

20 Claims, 13 Drawing Sheets

Related U.S. Application Data continuation of application No. 17/306,350, filed on May 3, 2021, now Pat. No. 11,669,330, which is a continuation of application No. 16/451,330, filed on Jun. 25, 2019, now Pat. No. 10,996,955, which is a continuation of application No. 15/991,653, filed on May 29, 2018, now Pat. No. 10,331,347, which is a continuation of application No. 14/920,365, filed on Oct. 22, 2015, now abandoned.

(56) References Cited

U.S. PATENT DOCUMENTS

| | | | |
|---|---|---|---|
| 2004/0054849 A1* | 3/2004 | Deenadhayalan | G06F 11/1076 711/112 |
| 2007/0300037 A1 | 12/2007 | Rogers | |
| 2009/0100253 A1 | 4/2009 | Moyer | |
| 2010/0115014 A1* | 5/2010 | Hargil | G06F 9/30003 708/212 |
| 2010/0242025 A1 | 9/2010 | Yamazaki | |
| 2010/0332578 A1 | 12/2010 | Gopal | |
| 2011/0302394 A1 | 12/2011 | Russell | |
| 2013/0185539 A1 | 7/2013 | Hung | |
| 2013/0212353 A1* | 8/2013 | Mimar | G06F 9/30036 712/4 |
| 2015/0012690 A1 | 1/2015 | Bruce | |
| 2016/0054995 A1 | 2/2016 | Dehner | |
| 2017/0177497 A1 | 6/2017 | Chun | |

OTHER PUBLICATIONS

E. Rublee, V. Rabaud, K. Konolige, G. Bradski, "ORB: An Efficient Alternative to SIFT or Surf", ICCV, 2564 2571, 2011, 8 pgs.

M. Calonder, V. Lepetit, P. Fua, "BRIEF: Binary Robust Independent Elementary Features", ECCV, 778 792, 2010, 14 pgs.

T. Watanabe, S. Ito, K. Yokoi, "Co Occurrence histograms of oriented gradients for pedestrian detection", PSIVT, pp. 37-47, 2009.

* cited by examiner

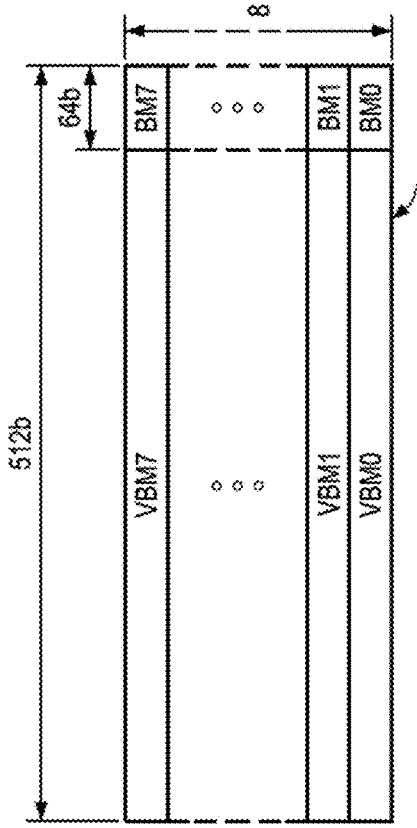
FIG. 10
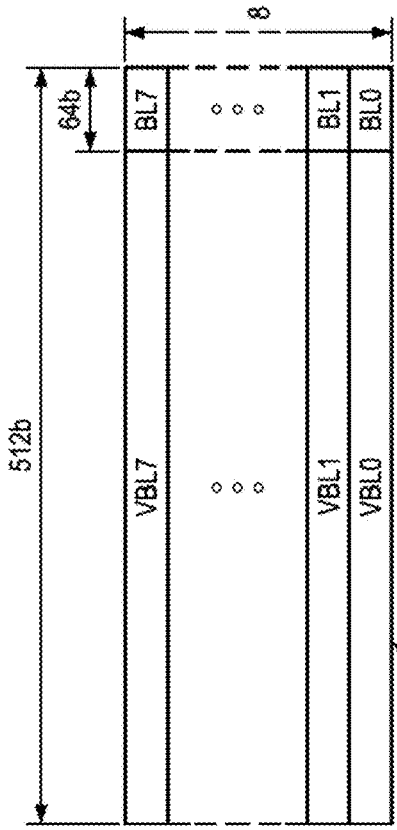
FIG. 9
FIG. 12

METHOD FOR PERFORMING RANDOM READ ACCESS TO A BLOCK OF DATA USING PARALLEL LUT READ INSTRUCTION IN VECTOR PROCESSORS

CROSS-REFERENCE TO RELATED APPLICATIONS

This application is a continuation of U.S. patent application Ser. No. 18/321,037, filed on May 22, 2023, which is a continuation of U.S. application Ser. No. 17/306,350, filed on May 3, 2021, now U.S. Pat. No. 11,669,330, issued on Jun. 6, 2023, which is a continuation of U.S. patent application Ser. No. 16/451,330, filed on Jun. 25, 2019, now U.S. Pat. No. 10,996,955, issued on May 4, 2021, which is a continuation of U.S. patent application Ser. No. 15/991,653, filed on May 29, 2018, now U.S. Pat. No. 10,331,347, issued on Jun. 25, 2019, which is a continuation of U.S. patent application Ser. No. 14/920,365, filed on Oct. 22, 2015, now abandoned, which claims priority to Indian Provisional Application No. 5509/CHE/2014, filed on Nov. 3, 2014, each of which is incorporated by reference herein in its entirety.

TECHNICAL FIELD OF THE INVENTION

The technical field of this invention is digital data processing and more specifically data operand fetching.

BACKGROUND OF THE INVENTION

Random read accesses within a block of data is difficult to parallelize for vector SIMD operations because data needs to be fetched from non-sequential locations. Vector Load instructions can typically fetch only sequential data locations and in some cases certain predictable patterns for non-sequential data. When access is completely random, vector load instructions are insufficient to perform parallel data fetch.

The strength of vector SIMD engines lies in its ability to parallelize computations over multiple data points simultaneously. If it is not possible to parallelize computations over multiple data points for a given algorithm, performance of the concerned algorithm drops drastically and it offers no advantage over a scalar CPU core. Random read access within a block of data located in memory is one such problem where lack of parallelization causes a performance bottleneck. This kind of access pattern is present in key vision kernels like BRIEF feature descriptor (described in M. Calonder, V. Lepetit, P. Fua, "BRIEF: Binary Robust Independent Elementary Features", *ECCV*, 778-792, 2010), and ORB feature detection and description algorithms (described in E. Rublee, V. Rabaud, K. Konolige, G. Bradski, "ORB: An Efficient Alternative to SIFT or SURF", *ICCV*, 2564-2571, 2011). In vision kernels such as FAST feature detector (described in E. Rosten and T. Drummond, "Machine Learning for High-Speed Corner Detection", *Computer Vision—ECCV* 2006, *Lecture Notes in Computer Science*, Volume 3951, 2006, pp 430-443) and CoHOG (described in T. Watanabe, S. Ito, K. Yokoi, "Co-occurrence histograms of oriented gradients for pedestrian detection", *PSIVT*, pages 37-47, 2009), though the access pattern per block is fixed, the pattern is still fairly complex.

SUMMARY OF THE INVENTION

This invention deals with the problem of paralleling random read access within a reasonably sized block of data for a vector SIMD processor. The invention determines whether overhead of defining look up tables for the data access is less than using plural scalar loads.

If this is true, the invention sets up plural parallel look up tables, moves data from main memory to each plural parallel look up table and then employs a look up table read instruction to simultaneously move data from each parallel look up table to a corresponding part a vector destination register. This enables data processing by vector single instruction multiple data (SIMD) operations. This vector destination register load can be repeated if the tables store more used data. New data can be loaded into the original tables if appropriate.

A level one memory is preferably partitioned as part data cache and part directly addressable memory. The look up table memory is stored in the directly addressable memory.

BRIEF DESCRIPTION OF THE DRAWINGS

These and other aspects of this invention are illustrated in the drawings, in which:

FIG. 9 illustrates a local vector register file shared by arithmetic functional units;

FIG. 10 illustrates a local vector register file shared by multiply and correlation functional units;

FIG. 12 illustrates sixteen instructions of a single fetch packet;

FIG. 20 illustrate a first known data access pattern poorly suited for vector SIMD processing;

FIG. 21 illustrates a second known data access pattern poorly suited for vector SIMD processing;

DETAILED DESCRIPTION OF PREFERRED EMBODIMENTS

Figure 1:
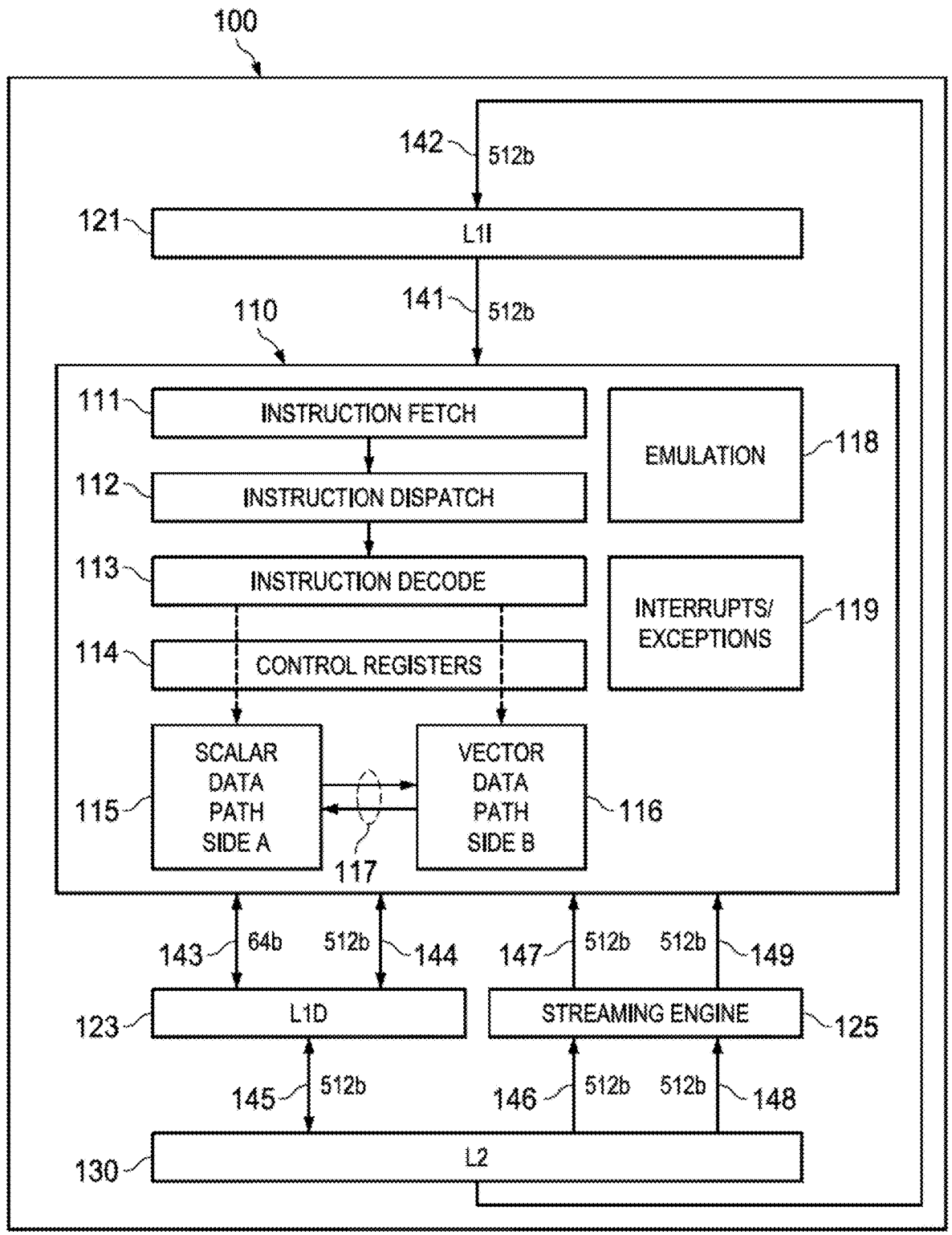
FIG. 1 illustrates a dual scalar/vector datapath processor according to one embodiment of this invention.

FIG. 1 illustrates a dual scalar/vector datapath processor according to a preferred embodiment of this invention. Processor 100 includes separate level one instruction cache (L1I) 121 and level one data cache (L1D) 123. Processor 100 includes a level two combined instruction/data cache (L2) 130 that holds both instructions and data. FIG. 1 illustrates connection between level one instruction cache 121 and level two combined instruction/data cache 130 (bus 142). FIG. 1 illustrates connection between level one data cache 123 and level two combined instruction/data cache 130 (bus 145). In the preferred embodiment of processor 100 level two combined instruction/data cache 130 stores both instructions to back up level one instruction cache 121 and data to back up level one data cache 123. In the preferred embodiment level two combined instruction/data cache 130 is further connected to higher level cache and/or main memory in a manner not illustrated in FIG. 1. In the preferred embodiment central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In the preferred embodiment the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

In the preferred embodiment of this invention, central processing unit core 110 includes plural functional units to perform instruction specified data processing tasks. Instruction dispatch unit 112 determines the target functional unit of each fetched instruction. In the preferred embodiment central processing unit 110 operates as a very long instruction word (VLIW) processor capable of operating on plural instructions in corresponding functional units simultaneously. Preferably a compiler organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In the preferred embodiment instruction dispatch unit 112 may operate on plural instructions in parallel. The number of such parallel instructions is set by the size of the execute packet. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116 in a manner not relevant to this invention. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 include plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enable central processing unit core 110 to be responsive to external, asynchronous events (interrupts) and to respond to attempts to perform improper operations (exceptions).

Central processing unit core 110 includes streaming engine 125. Streaming engine 125 supplies two data streams from predetermined addresses typically cached in level two combined cache 130 to register files of vector datapath side B. This provides controlled data movement from memory (as cached in level two combined cache 130) directly to register files. This is further detailed below.

FIG. 1 illustrates exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 are and 144 illustrated s bidirectional supporting both central processing unit 110 data reads and data writes. Level one data cache 123 exchanges data with level two combined cache 130 via bus 145. Bus 145 is preferably a 512-bit bus. Bus 145 is illustrated as bidirectional supporting cache service for both central processing unit 110 data reads and data writes.

Level two combined cache 130 supplies data of a first data stream to streaming engine 125 via bus 146. Bus 146 is preferably a 512-bit bus. Streaming engine 125 supplies data of this first data stream to register files of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to register files of vector datapath side B 116 via bus 149. Bus 149 is preferably a 512-bit bus. Busses 146, 147, 148 and 149 are illustrated as unidirectional from level two combined cache 130 to streaming engine 125 and to vector datapath side B 116 in accordance with the preferred embodiment of this invention.

In the preferred embodiment of this invention, both level one data cache 123 and level two combined cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
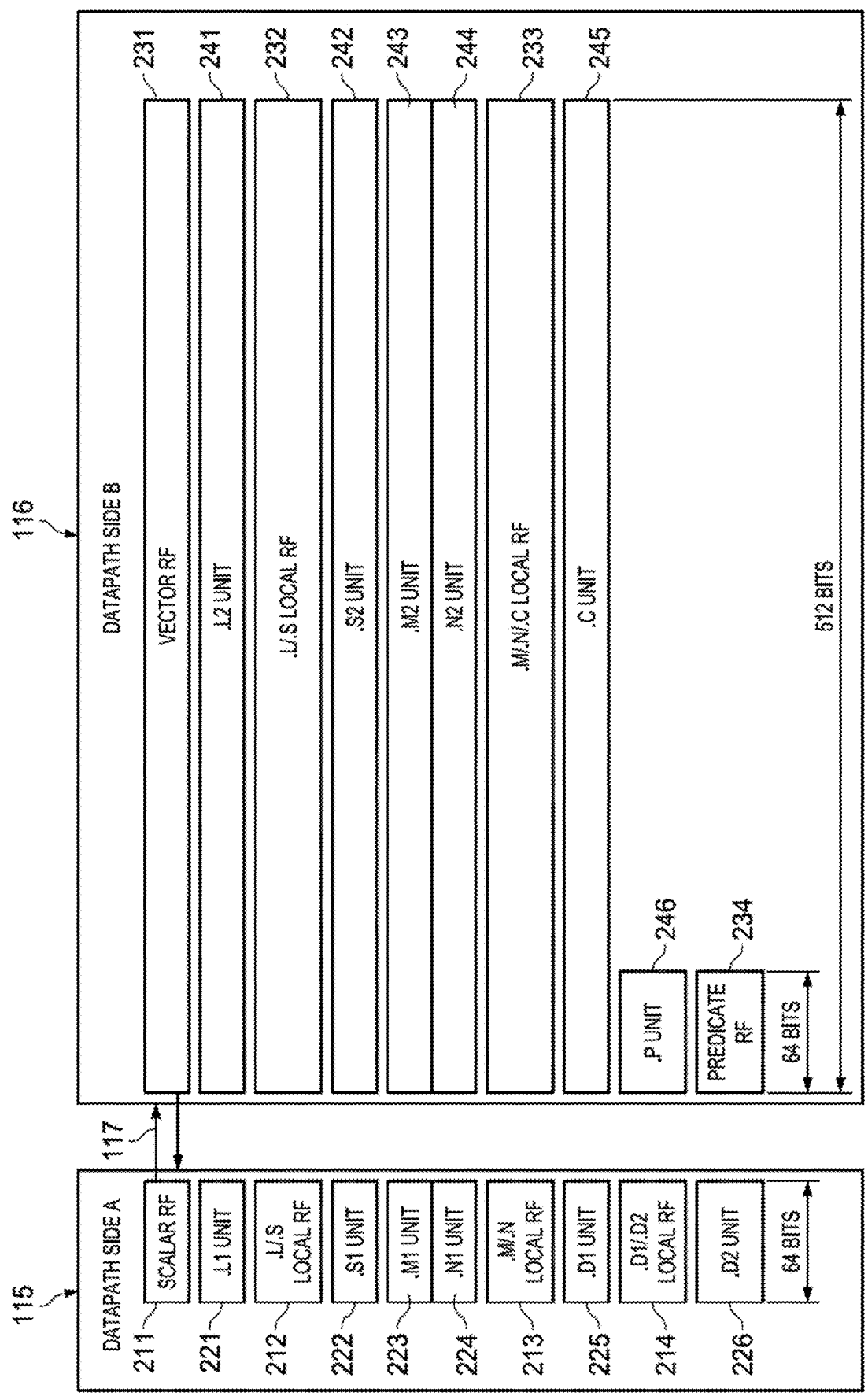
FIG. 2 illustrates the registers and functional units in the dual scalar/vector datapath processor illustrated in FIG. 1.

FIG. 2 illustrates further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global scalar: register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units may read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result may be written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222 except on wider 512-bit data. The result may be written into an instruction specified register of global vector register file 231, L2/S2 local register file 232, M2/N2/C local register file 233 or predicate register file 234.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result may be written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232, or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 includes also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include AND, ANDN, OR, XOR, NOR, BITR, NEG, SET, BITCNT, RMBD, BIT Decimate and Expand. A commonly expected use of P unit 246 includes manipulation of the SIMD vector comparison results for use in control of a further SIMD vector operation.

Figure 3:
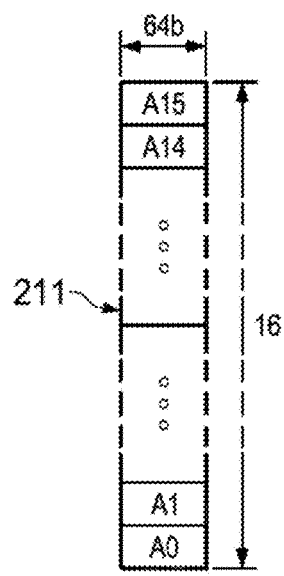
FIG. 3 illustrates a global scalar register file.

FIG. 3 illustrates global scalar register file 211. There are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225 and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245 and P unit 246) can read from global scalar register file 211 via crosspath 117 under restrictions that will be detailed below.

Figure 4:
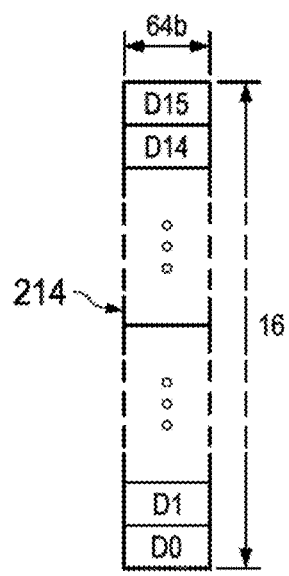
FIG. 4 illustrates a local scalar register file shared by arithmetic functional units.

FIG. 4 illustrates D1/D2 local register file 214. There are 16 independent 64-bit wide scalar registers designated D0 to D16. Each register of D1/D2 local register file 214 can be read from or written to as 64-bits of scalar data. All scalar datapath side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

Figure 5:
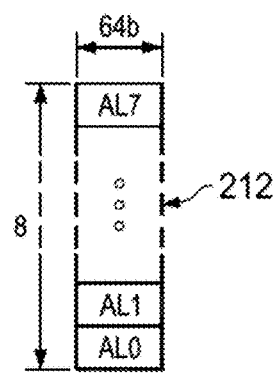
FIG. 5 illustrates a local scalar register file shared by multiply functional units.

FIG. 5 illustrates L1/S1 local register file 212. The embodiment illustrated in FIG. 5 has 8 independent 64-bit wide scalar registers designated AL0 to AL7. The preferred instruction coding (see FIG. 13) permits L1/S1 local register file 212 to include up to 16 registers. The embodiment of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225 and D2 unit 226) can write to L1/S1 local scalar register file 212. Only L1 unit 221 and S1 unit 222 can read from L1/S1 local scalar register file 212.

Figure 6:
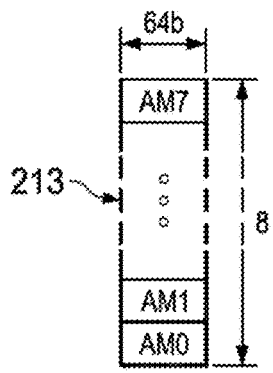
FIG. 6 illustrates a local scalar register file shared by load/store units.

FIG. 6 illustrates M1/N1 local register file 213. The embodiment illustrated in FIG. 6 has 8 independent 64-bit wide scalar registers designated AM0 to AM7. The preferred instruction coding (see FIG. 13) permits M1/N1 local register file 213 to include up to 16 registers. The embodiment of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
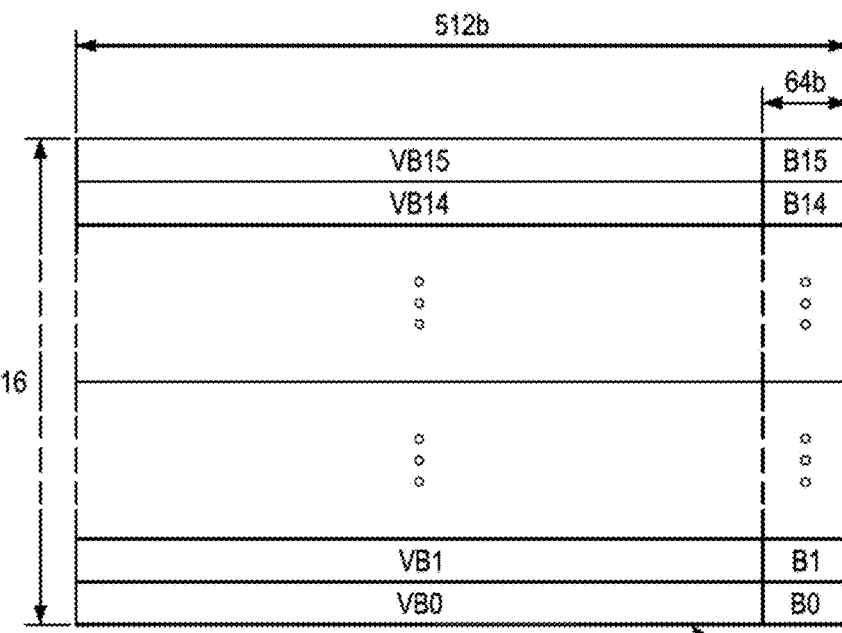
FIG. 7 illustrates a global vector register file.

FIG. 7 illustrates global vector register file 231. There are 16 independent 512-bit wide scalar registers. Each register of global vector register file 231 can be read from or written to as 64-bits of scalar data designated B0 to B15. Each register of global vector register file 231 can be read from or written to as 512-bits of vector data designated VB0 to VB15. The instruction type determines the data size. All vector datapath side B 116 functional units (L2 unit 241, S2 unit 242, M2 unit 243, N2 unit 244, C unit 245 and P unit 246) can read or write to global vector register file 231. Scalar datapath side A 115 functional units (L1 unit 221, S1 unit 222, M1 unit 223, N1 unit 224, D1 unit 225 and D2 unit 226) can read from global vector register file 231 via crosspath 117 under restrictions that will be detailed below.

Figure 8:
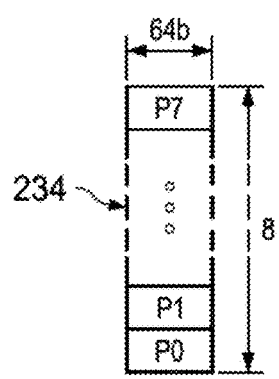
FIG. 8 illustrates a predicate register file.

FIG. 8 illustrates P local register file 234. There are 8 independent 64-bit wide registers designated P0 to P15.

Each register of P local register file 234 can be read from or written to as 64-bits of scalar data. Vector datapath side B 116 functional units L2 unit 241, S2 unit 242, C unit 244 and P unit 246 can write to P local register file 234. Only L2 unit 241, S2 unit 242 and P unit 246 can read from P local scalar register file 234. A commonly expected use of P local register file 234 includes: writing one bit SIMD vector comparison results from L2 unit 241, S2 unit 242 or C unit 244; manipulation of the SIMD vector comparison results by P unit 246; and use of the manipulated results in control of a further SIMD vector operation.

FIG. 9 illustrates L2/S2 local register file 232. The embodiment illustrated in FIG. 9 has independent 512-bit wide scalar registers. The preferred instruction coding (see FIG. 13) permits L2/S2 local register file 232 to include up to 16 registers. The embodiment of FIG. 9 implements only 8 registers to reduce circuit size and complexity. Each register of L2/S2 local vector register file 232 can be read from or written to as 64-bits of scalar data designated BL0 to BL7. Each register of L2/S2 local vector register file 232 can be read from or written to as 512-bits of vector data designated VBL0 to VBL7. The instruction type determines the data size. All vector datapath side B 116 functional units (L2 unit 241, S2 unit 242, M2 unit 243, N2 unit 244, C unit 245 and P unit 246) can write to L2/S2 local vector register file 232. Only L2 unit 241 and S2 unit 242 can read from L2/S2 local vector register file 232.

FIG. 10 illustrates M2/N2/C local register file 233. The embodiment illustrated in FIG. 10 has 8 independent 512-bit wide scalar registers. The preferred instruction coding (see FIG. 13) permits M2/N2/C local register file 233 to include up to 16 registers. The embodiment of FIG. 10 implements only 8 registers to reduce circuit size and complexity. Each register of M2/N2/C local vector register file 233 can be read from or written to as 64-bits of scalar data designated BM0 to BM7. Each register of M2/N2/C local vector register file 233 can be read from or written to as 512-bits of vector data designated VBM0 to VBM7. All vector datapath side B 116 functional units (L2 unit 241, S2 unit 242, M2 unit 243, N2 unit 244, C unit 245 and P unit 246) can write to M2/N2/C local vector register file 233. Only M2 unit 233, N2 unit 244 and C unit 245 can read from M2/N2/C local vector register file 233.

Crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231. Plural scalar datapath side A 115 functional units may employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) may read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units may employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened streaming engine 125: calculates the address; fetches the defined data type from level two unified cache (which may require cache service from a higher level memory); performs data type manipulation such as zero extension, sign extension, data element sorting/swapping such as matrix transposition; and delivers the data directly to the programmed data register file within CPU 110. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

CPU 110 operates on an instruction pipeline. Instructions are fetched in instruction packets of fixed length further described below. All instructions require the same number of pipeline phases for fetch and decode, but require a varying number of execute phases.

Figure 11:
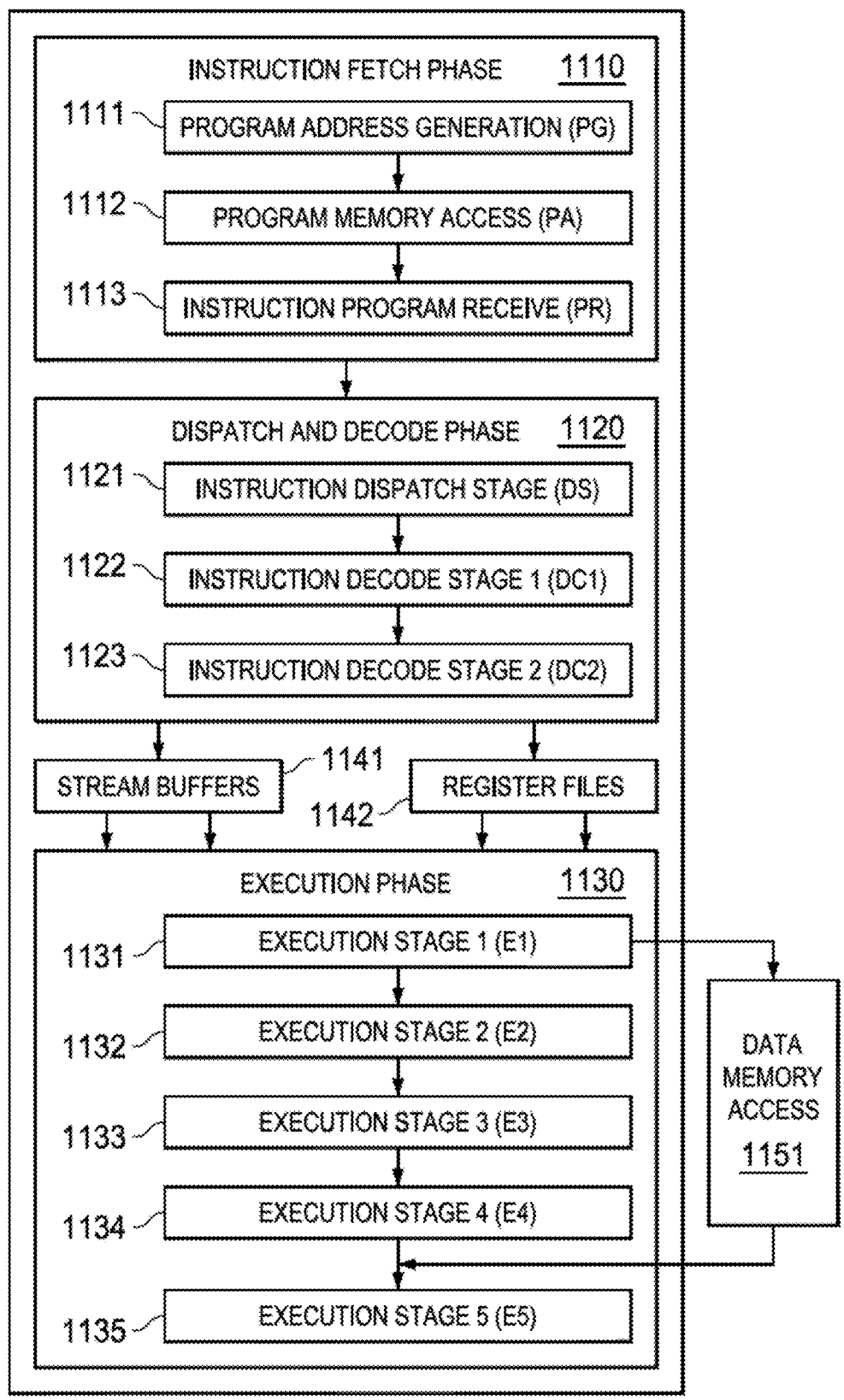
FIG. 11 illustrates pipeline phases of a central processing unit according to an embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache LII. During the program access stage 1112 (PA) the level one instruction cache LII processes the request, accesses the data in its memory and sends a fetch packet to the CPU boundary. During the program receive stage 1113 (PR) the CPU registers the fetch packet.

Instructions are always fetched sixteen 32-bit wide slots, constituting a fetch packet, at a time. FIG. 12 illustrates 16 instructions 1201 to 1216 of a single fetch packet. Fetch packets are aligned on 512-bit (16-word) boundaries. The preferred embodiment employs a fixed 32-bit instruction length. Fixed length instructions are advantageous for several reasons. Fixed length instructions enable easy decoder alignment. A properly aligned instruction fetch can load plural instructions into parallel instruction decoders. Such a properly aligned instruction fetch can be achieved by pre-determined instruction alignment when stored in memory (fetch packets aligned on 512-bit boundaries) coupled with a fixed instruction packet fetch. An aligned instruction fetch permits operation of parallel decoders on instruction-sized fetched bits. Variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache LII can take different number of clock cycles, depending on external circumstances such as whether there is a hit in level one instruction cache 121 or a hit in level two combined cache 130. Therefore program access stage 1112 (PA) can take several clock cycles instead of 1 clock cycle as in the other stages.

The instructions executing in parallel constitute an execute packet. In the preferred embodiment an execute packet can contain up to sixteen instructions. No two instructions in an execute packet may use the same functional unit. A slot is one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 1120 include instruction dispatch to appropriate execution unit stage 1121 (DS), instruction pre-decode stage 1122 (DC1), and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers and associated paths are decoded for the execution of the instructions in the functional units. During the instruction decode, operand reads stage 1123 (DC2), more detailed unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
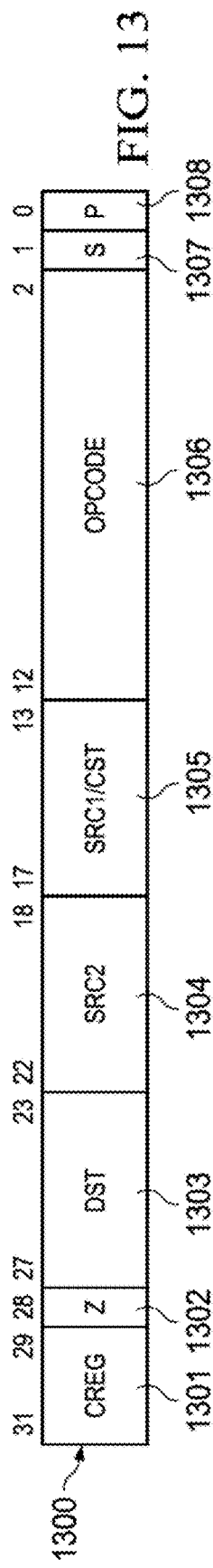
FIG. 13 illustrates an example of the instruction coding of instructions used by this invention.

FIG. 13 illustrates an example of the instruction coding 1300 of functional unit instructions used by this invention. Each instruction consists of 32 bits and controls the operation of one of the individually controllable functional units (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246). The bit fields are defined as follows.

The creg field 1301 (bits 29 to 31) and the z bit 1302 (bit 28) are optional fields used in conditional instructions. These bits are used for conditional instructions to identify the predicate register and the condition. The z bit 1302 (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field 1301 and the z field 1302 are encoded in the instruction as shown in Table 1.

TABLE 1

| Conditional | creg | | | z |
| --- | --- | --- | --- | --- |
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Execution of a conditional instruction is conditional upon the value stored in the specified data register. This data register is in the global scalar register file 211 for all functional units. Note that "z" in the z bit column refers to the zero/not zero comparison selection noted above and "x" is a don't care state. This coding can only specify a subset of the 16 global registers as predicate registers. This selection was made to preserve bits in the instruction coding. Note that unconditional instructions do not have these optional bits. For unconditional instructions these bits in fields 1301 and 1302 (28 to 31) are preferably used as additional opcode bits.

The dst field 1303 (bits 23 to 27) specifies a register in a corresponding register file as the destination of the instruction results.

The src2 field 1304 (bits 18 to 22) specifies a register in a corresponding register file as the second source operand.

The src1/cst field 1305 (bits 21 to 17) has several meanings depending on the instruction opcode field (bits 2 to 12 for all instructions and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field 1306 (bits 2 to 12) for all instructions (and additionally bits 28 to 31 for unconditional instructions) specifies the type of instruction and designates appropriate instruction options. This includes unambiguous designation of the functional unit used and operation performed. A detailed explanation of the opcode is beyond the scope of this invention except for the instruction options detailed below.

The s bit 1307 (bit 1) designates scalar datapath side A 115 or vector datapath side B 116. If s=0, then scalar datapath side A 115 is selected. This limits the functional unit to L1 unit 221, S1 unit 222, M1 unit 223, N1 unit 224, D1 unit 225 and D2 unit 226 and the corresponding register files illustrated in FIG. 2. Similarly, s=1 selects vector datapath side B 116 limiting the functional unit to L2 unit 241, S2 unit 242, M2 unit 243, N2 unit 244, P unit 246 and the corresponding register file illustrated in FIG. 2.

The p bit 1308 (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to twelve instructions. Each instruction in an execute packet must use a different functional unit.

Figure 14:
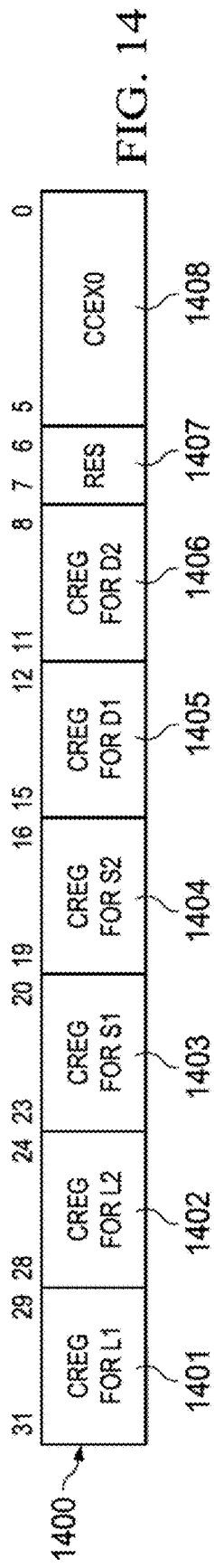
FIG. 14 illustrates the bit coding of a condition code extension slot 0.

There are two different condition code extension slots. Each execute packet can contain one each of these unique 32-bit condition code extension slots which contains the 4-bit creg/z fields for the instructions in the same execute packet. FIG. 14 illustrates the coding for condition code extension slot 0 and FIG. 15 illustrates the coding for condition code extension slot 1.

FIG. 14 illustrates the coding for condition code extension slot 0 having 32 bits. Field 1401 (bits 28 to 31) specify 4 creg/z bits assigned to the L1 unit 221 instruction in the same execute packet. Field 1402 (bits 27 to 24) specify 4 creg/z bits assigned to the L2 unit 241 instruction in the same execute packet. Field 1403 (bits 19 to 23) specify 4 creg/z bits assigned to the S1 unit 222 instruction in the same execute packet. Field 1404 (bits 16 to 19) specify 4 creg/z bits assigned to the S2 unit 242 instruction in the same execute packet. Field 1405 (bits 12 to 15) specify 4 creg/z bits assigned to the D1 unit 225 instruction in the same execute packet. Field 1406 (bits 8 to 11) specify 4 creg/z bits assigned to the D2 unit 226 instruction in the same execute packet. Field 1407 (bits 6 and 7) is unused/reserved. Field 1408 (bits 0 to 5) are coded a set of unique bits (CCEX0) to identify the condition code extension slot 0. Once this unique ID of condition code extension slot 0 is detected, the corresponding creg/z bits are employed to control conditional execution of any L1 unit 221, L2 unit 241, S1 unit 222, S2 unit 242, D1 unit 225 and D2 unit 226 instruction in the same execution packet. These creg/z bits are interpreted as shown in Table 1. If the corresponding instruction is conditional (includes creg/z bits) the corresponding bits in the condition code extension slot 0 override the condition code bits in the instruction. Note that no execution packet can have more than one instruction directed to a particular execution unit. No execute packet of instructions can contain more than one condition code extension slot 0. Thus the mapping of creg/z bits to functional unit instruction is unambiguous. Setting the creg/z bits equal to "0000" makes the instruction unconditional. Thus a properly coded condition code extension slot 0 can make some corresponding instructions conditional and some unconditional.

Figure 15:
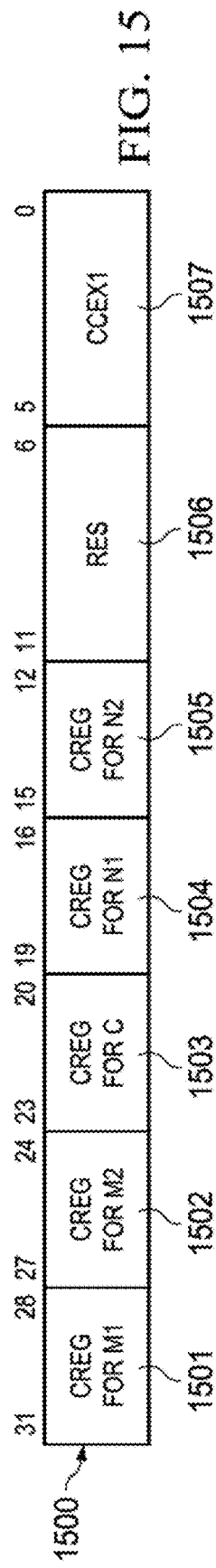
FIG. 15 illustrates the bit coding of a condition code extension slot 1.

FIG. 15 illustrates the coding for condition code extension slot 1 having 32 bits. Field 1501 (bits 28 to 31) specify 4 creg/z bits assigned to the M1 unit 223 instruction in the same execute packet. Field 1502 (bits 27 to 24) specify 4 creg/z bits assigned to the M2 unit 243 instruction in the same execute packet. Field 1503 (bits 19 to 23) specify 4 creg/z bits assigned to the C unit 245 instruction in the same execute packet. Field 1504 (bits 16 to 19) specify 4 creg/z bits assigned to the N1 unit 224 instruction in the same execute packet. Field 1505 (bits 12 to 15) specify 4 creg/z bits assigned to the N2 unit 244 instruction in the same execute packet. Field 1506 (bits 6 to 11) is unused/reserved. Field 1507 (bits 0 to 5) are coded a set of unique bits (CCEX1) to identify the condition code extension slot 1. Once this unique ID of condition code extension slot 1 is detected, the corresponding creg/z bits are employed to control conditional execution of any M1 unit 223, M2 unit 243, C unit 245, N1 unit 224 and N2 unit 244 instruction in the same execution packet. These creg/z bits are interpreted as shown in Table 1. If the corresponding instruction is conditional (includes creg/z bits) the corresponding bits in the condition code extension slot 1 override the condition code bits in the instruction. Note that no execution packet can have more than one instruction directed to a particular execution unit. No execute packet of instructions can contain more than one condition code extension slot 1. Thus the mapping of creg/z bits to functional unit instruction is unambiguous. Setting the creg/z bits equal to "0000" makes the instruction unconditional. Thus a properly coded condition code extension slot 1 can make some instructions conditional and some unconditional.

It is feasible for both condition code extension slot 0 and condition code extension slot 1 to include a p bit to define an execute packet as described above in conjunction with FIG. 13. In the preferred embodiment, as illustrated in FIGS. 14 and 15, code extension slot 0 and condition code extension slot 1 preferably have bit 0 (p bit) always encoded as 1. Thus neither condition code extension slot 0 not condition code extension slot 1 can be in the last instruction slot of an execute packet.

There are two different constant extension slots. Each execute packet can contain one each of these unique 32-bit constant extension slots which contains 27 bits to be concatenated as high order bits with the 5-bit constant field 1305 to form a 32-bit constant. As noted in the instruction coding description above only some instructions define the src1/cst field 1305 as a constant rather than a source register identifier. At least some of those instructions may employ a constant extension slot to extend this constant to 32 bits.

Figure 16:
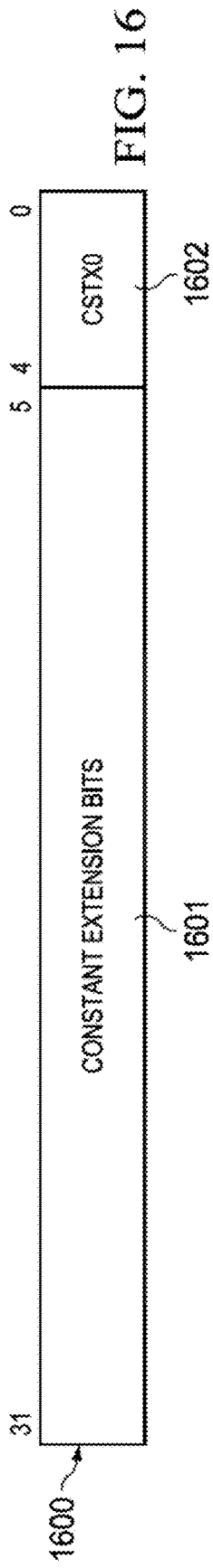
FIG. 16 illustrates the bit coding of a constant extension slot 0.

FIG. 16 illustrates the fields of constant extension slot 0. Each execute packet may include one instance of constant extension slot 0 and one instance of constant extension slot 1. FIG. 16 illustrates that constant extension slot 0 1600 includes two fields. Field 1601 (bits 5 to 31) constitute the most significant 27 bits of an extended 32-bit constant including the target instruction field 1305 as the five least significant bits. Field 1602 (bits 0 to 4) are coded a set of unique bits (CSTX0) to identify the constant extension slot 0. In the preferred embodiment constant extension slot 0 1600 can only be used to extend the constant of one of an L1 unit 221 instruction, data in a D1 unit 225 instruction, an S2 unit 242 instruction, an offset in a D2 unit 226 instruction, an M2 unit 243 instruction, an N2 unit 244 instruction, a branch instruction, or a C unit 245 instruction in the same execute packet. Constant extension slot 1 is similar to constant extension slot 0 except that bits 0 to 4 are coded a set of unique bits (CSTX1) to identify the constant extension slot 1. In the preferred embodiment constant extension slot 1 can only be used to extend the constant of one of an L2 unit 241 instruction, data in a D2 unit 226 instruction, an S1 unit 222 instruction, an offset in a D1 unit 225 instruction, an M1 unit 223 instruction or an N1 unit 224 instruction in the same execute packet.

Constant extension slot 0 and constant extension slot 1 are used as follows. The target instruction must be of the type permitting constant specification. As known in the art this is implemented by replacing one input operand register specification field with the least significant bits of the constant. Instruction decoder 113 determines this case known as an immediate field from the instruction opcode bits. The target instruction also includes one constant extension bit dedicated to signaling whether the specified constant is not extended (preferably constant extension bit=0) or the constant is extended (preferably constant extension bit=1). If instruction decoder 113 detects constant extension slot 0 or constant extension slot 1, it further checks the other instructions within that execute packet for an instruction corresponding to the detected constant extension slot. A constant extension is made only if one corresponding instruction has a constant extension bit equal to 1.

Figure 17:
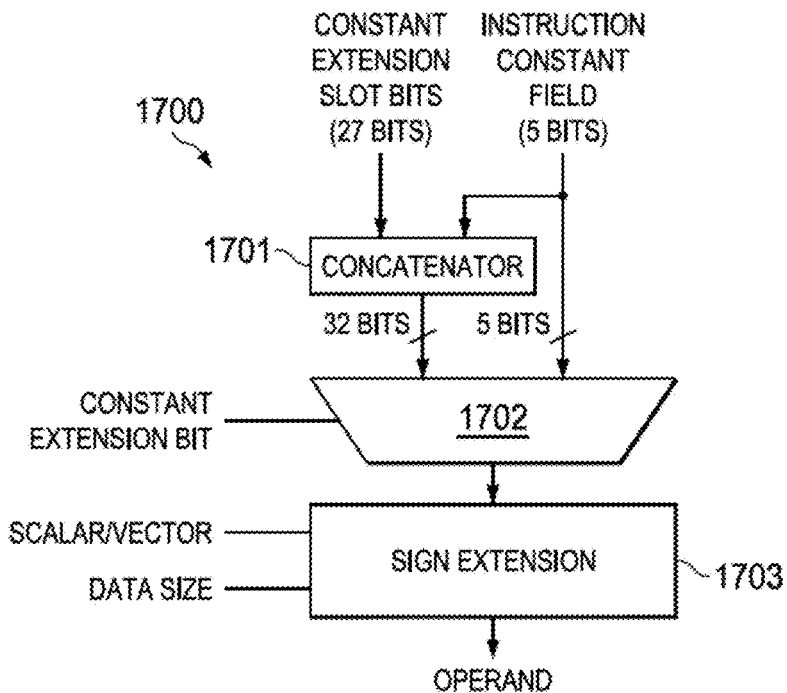
FIG. 17 is a partial block diagram illustrating sign extension.

FIG. 17 is a partial block diagram 1700 illustrating constant extension. FIG. 17 assumes that instruction decoder 113 detects a constant extension slot and a corresponding instruction in the same execute packet. Instruction decoder 113 supplies the 27 extension bits from the constant extension slot (bit field 1601) and the 5 constant bits (bit field 1305) from the corresponding instruction to concatenator 1701. Concatenator 1701 forms a single 32-bit word from these two parts. This combined 32-bit word is supplied to one input of multiplexer 1702. The 5 constant bits from the corresponding instruction field 1305 supply a second input to multiplexer 1702. Selection of multiplexer 1702 is controlled by the status of the constant extension bit. If the constant extension bit is 1 (extended), multiplexer 1702 selects the concatenated 32-bit input. If the constant extension bit is 0 (not extended), multiplexer 1702 selects the 5 constant bits from the corresponding instruction field 1305. Multiplexer 1702 supplies this output to an input of sign extension unit 1703.

Sign extension unit 1703 forms the final operand value from the input from multiplexer 1703. Sign extension unit 1703 receives control inputs Scalar/Vector and Data Size. The Scalar/Vector input indicates whether the corresponding instruction is a scalar instruction or a vector instruction. The functional units of data path side A 115 (L1 unit 221, S1 unit 222, M1 unit 223, N1 unit 224, D1 unit 225 and D2 unit 226) can only perform scalar instructions. Any instruction directed to one of these functional units is a scalar instruction. Data path side B functional units L2 unit 241, S2 unit 242, M2 unit 243, N2 unit 244 and C unit 245 may perform scalar instructions or vector instructions. Instruction decoder 113 determines whether the instruction is a scalar instruction or a vector instruction from the opcode bits. P unit 246 may only perform scalar instructions. The Data Size may be 8 bits (byte B), 16 bits (half-word H), 32 bits (word W) or 64 bits (double word D).

Table 2 lists the operation of sign extension unit 1703 for the various options.

TABLE 2

| Instruction Type | Operand Size | Constant Length | Action |
| --- | --- | --- | --- |
| Scalar | B/H/W/D | 5 bits | Sign extend to 64 bits |
| Scalar | B/H/W/D | 32 bits | Sign extend to 64 bits |
| Vector | B/H/W/D | 5 bits | Sign extend to operand size and replicate across whole vector |
| Vector | B/H/W | 32 bits | Replicate 32-bit constant across each 32-bit (W) lane |
| Vector | D | 32 bits | Sign extend to 64 bits and replicate across each 64-bit (D) lane |

It is feasible for both constant extension slot 0 and constant extension slot 1 to include a p bit to define an execute packet as described above in conjunction with FIG. 13. In the preferred embodiment, as in the case of the condition code extension slots, constant extension slot 0 and constant extension slot 1 preferably have bit 0 (p bit) always encoded as 1. Thus neither constant extension slot 0 nor constant extension slot 1 can be in the last instruction slot of an execute packet.

It is technically feasible for an execute packet to include a constant extension slot 0 or 1 and more than one corresponding instruction marked constant extended (constant extension bit=1). For constant extension slot 0 this would mean more than one of an L1 unit 221 instruction, data in a D1 unit 225 instruction, an S2 unit 242 instruction, an offset in a D2 unit 226 instruction, an M2 unit 243 instruction or an N2 unit 244 instruction in an execute packet have a constant extension bit of 1. For constant extension slot 1 this would mean more than one of an L2 unit 241 instruction, data in a D2 unit 226 instruction, an S1 unit 222 instruction, an offset in a D1 unit 225 instruction, an M1 unit 223 instruction or an N1 unit 224 instruction in an execute packet have a constant extension bit of 1. Supplying the same constant extension to more than one instruction is not expected to be a useful function. Accordingly, in one embodiment instruction decoder 113 may determine this case an invalid operation and not supported. Alternately, this combination may be supported with extension bits of the constant extension slot applied to each corresponding functional unit instruction marked constant extended.

Special vector predicate instructions use registers in predicate register file 234 to control vector operations. In the current embodiment all these SIMD vector predicate instructions operate on selected data sizes. The data sizes may include byte (8 bit) data, half word (16 bit) data, word (32 bit) data, double word (64 bit) data, quad word (128 bit) data and half vector (256 bit) data. Each bit of the predicate register controls whether a SIMD operation is performed upon the corresponding byte of data. The operations of P unit 245 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

L1 unit 221, S1 unit 222, L2 unit 241, S2 unit 242 and C unit 245 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 18:
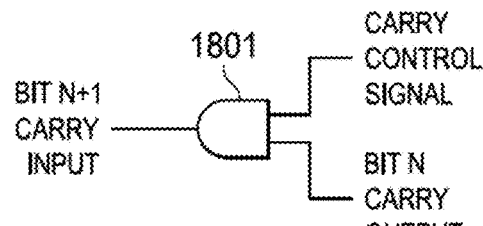
FIG. 18 illustrates the carry control for SIMD operations according to this invention.

FIG. 18 illustrates the carry control. AND gate 1801 receives the carry output of bit N within the operand wide arithmetic logic unit (64 bits for scalar datapath side A 115 functional units and 512 bits for vector datapath side B 116 functional units). AND gate 1801 also receives a carry control signal which will be further explained below. The output of AND gate 1801 is supplied to the carry input of bit N+1 of the operand wide arithmetic logic unit. AND gates such as AND gate 1801 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 3 below shows example carry control signals for the case of a 512 bit wide operand such as used by vector datapath side B 116 functional units which may be divided into sections of 8 bits, 16 bits, 32 bits, 64 bits, 128 bits or 256 bits. In Table 3 the upper 32 bits control the upper bits (bits 128 to 511) carries and the lower 32 bits control the lower bits (bits 0 to 127) carries. No control of the carry output of the most significant bit is needed, thus only 63 carry control signals are required.

TABLE 3

| Data Size | Carry Control Signals |
|---|---|
| 8 bits (B) | –000 0000 0000 0000 0000 0000 0000 0000 |
| | 0000 0000 0000 0000 0000 0000 0000 0000 |
| 16 bits (H) | –101 0101 0101 0101 0101 0101 0101 0101 |
| | 0101 0101 0101 0101 0101 0101 0101 0101 |
| 32 bits (W) | –111 0111 0111 0111 0111 0111 0111 0111 |
| | 0111 0111 0111 0111 0111 0111 0111 0111 |
| 64 bits (D) | –111 1111 0111 1111 0111 1111 0111 1111 |
| | 0111 1111 0111 1111 0111 1111 0111 1111 |
| 128 bits | –111 1111 1111 1111 0111 1111 1111 1111 |
| | 0111 1111 1111 1111 0111 1111 1111 1111 |

TABLE 3-continued

| Data Size | Carry Control Signals |
|---|---|
| 256 bits | –111 1111 1111 1111 1111 1111 1111 1111 |
| | 0111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

This invention is directed to a problem based upon a miss-match between an algorithm's data access pattern and vector SIMD processing. The strength of vector SIMD processing is in to parallel computations over multiple data points simultaneously. If an algorithm does not permit parallel computations over multiple data points, vector SIMD processing offers no advantage over scalar processing.

Figure 19:
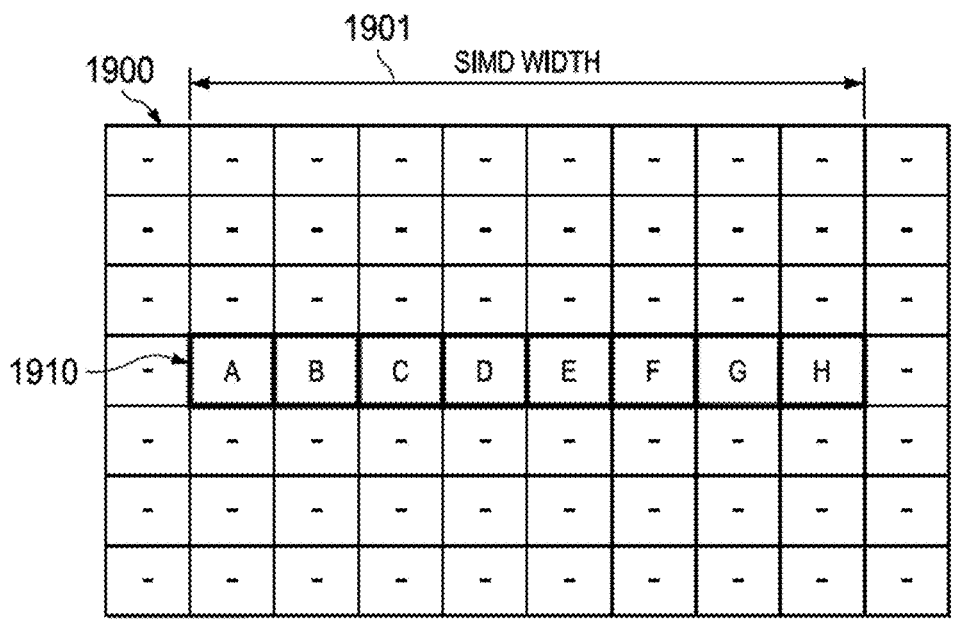
FIG. 19 illustrates a memory access pattern that enables advantageous use of vector SIMD processing.

The nature of the data distribution within memory and the pattern of data element access generally controls whether vector SIMD provides faster processing. FIG. 19 illustrates a memory access pattern that enables advantageous use of vector SIMD processing. Memory block 1900 includes data elements A to H 1710. As shown in FIG. 19, data elements 1910 fit within the SIMD width 1901. A single vector load may transfer data elements 1910 from memory block 1900 to a vector register for immediate vector SIMD processing.

Figures 20, 21:
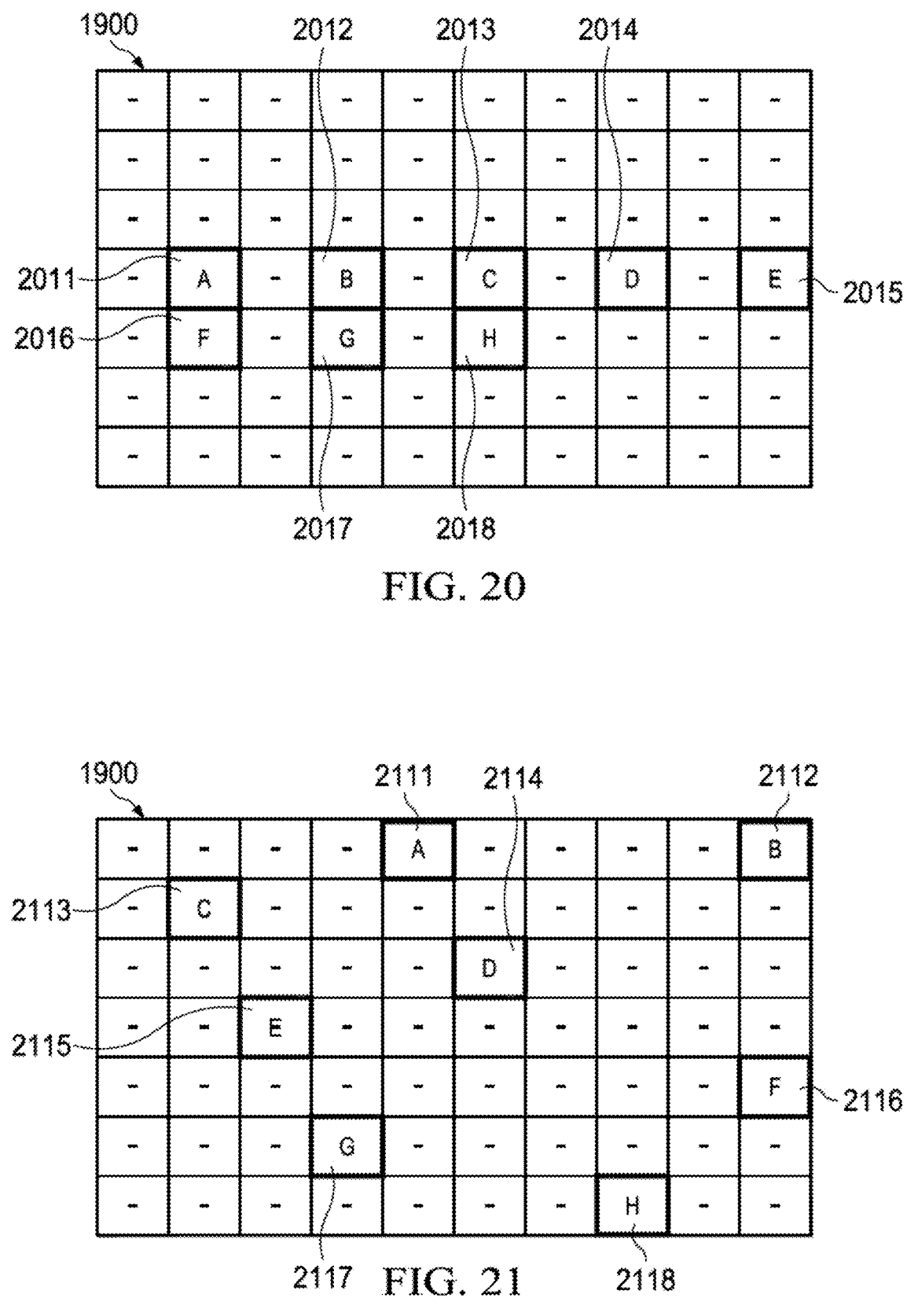

FIGS. 20 and 21 illustrate data access patterns poorly suited for vector SIMD processing. FIG. 20 illustrates memory block 1900 and data elements A 2011, B 2012, C 2013, D 2014, E 2015, F 2016, G 2017 and H 2018. This represents a regular pattern (every other data element) but does not include adjacent data elements. Depending upon the particular regularity of the data pattern this may be advantageously performed by vector SIMD processes. The data elements can be loaded via two or more vector loads into corresponding vector registers. The data elements may be processed via vector SIMD operations and the non-data elements discarded. Alternately, one or more instructions can be used to compact the data elements into adjacent slots of a vector register or registers.

FIG. 21 illustrates a data access pattern where vector loads would be inefficient. FIG. 21 illustrates memory block 1900 and data elements A 2111, B 2112, C 2113, D 2114, E 2115, F 2116, G 2117 and H 2118. Data elements A 2111, B 2112, C 2113, D 2114, E 2115, F 2116, G 2117 and H 2118 are disposed in an irregular pattern. Memory access via vector loads will not be helpful in reducing the number of memory accesses. Vector loads would not arrange data elements A 2111, B 2112, C 2113, D 2114, E 2115, F 2116, G 2117 and H 2118 into vector registers where vector SIMD operations would advance processing efficiency.

Figure 22:
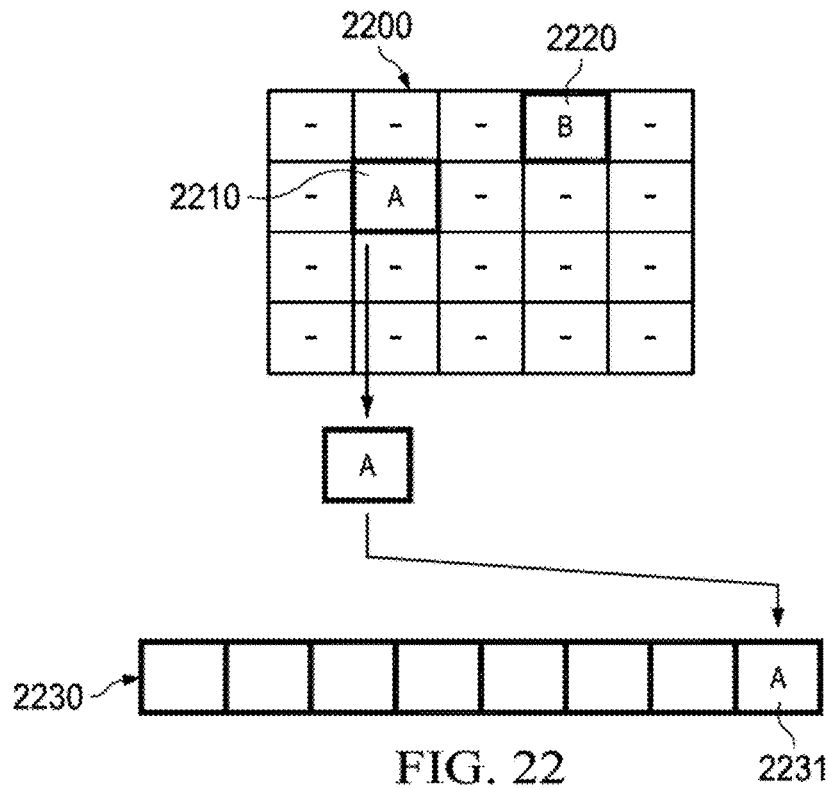
FIG. 22 illustrates a first step in a prior art scalar load operation for vector SIMD processing.
Figure 23:
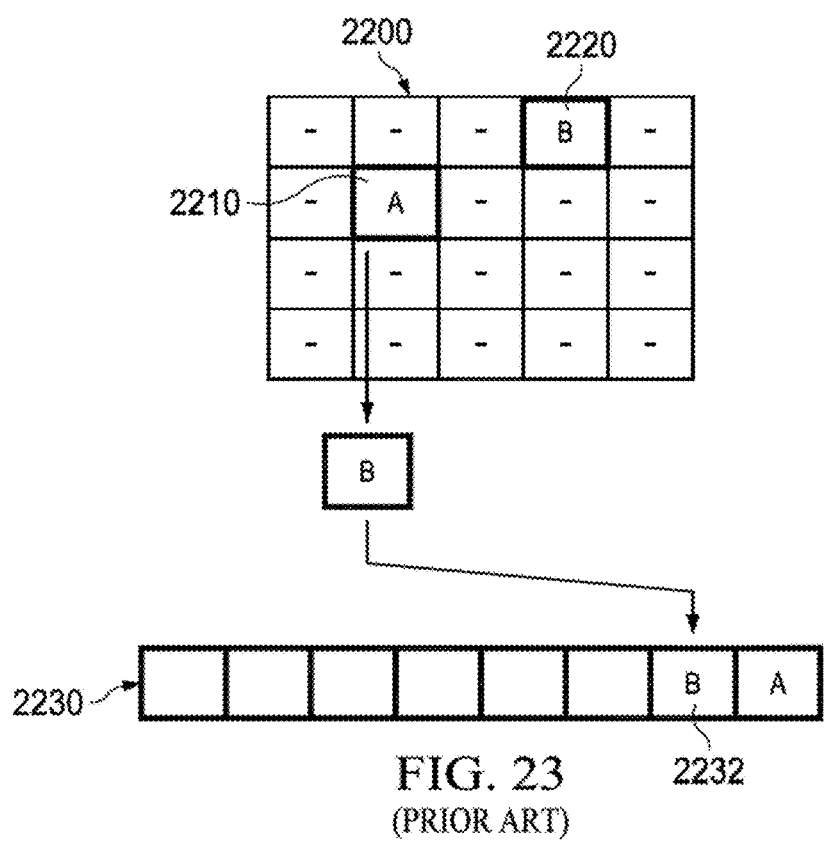
FIG. 23 illustrates a second step in a prior art scalar load operation for vector SIMD processing.

A common prior art technique to deal with random memory access patterns such as illustrated in FIG. 21 employs plural scalar loads. FIGS. 22 and 23 illustrate memory block 2200 and data elements A 2210 and B 2220. As illustrated schematically in FIG. 22 a first scalar load operation loads data element A 2210 into slot 2231 of vector register 2230. FIG. 23 illustrates a second scalar load of data element B 2220 into slot 2232 of vector register 2230. This prior art technique performs similar single scalar load for each data element to be read loading the data elements into the remaining slots of vector register 2230. Once filled a vector SIMD operation may be performed on the SIMD data in vector register 2230. The process may be repeated as many times as needed to move data elements to corresponding vector registers.

This prior art technique has several disadvantages. This technique requires too many memory accesses. The memory latency of these many accesses limits performance. Because each memory access requires a load instruction, many instructions are needed. This prior art technique does not effectively utilize the load bandwidth. This prior technique wastes multiple cycles in art re-arranging the data into a vector register.

This invention employs a special purpose instruction implemented on central processing unit 110 for a different purpose than originally contemplated. The special instruction is a look-up table read. In the preferred embodiment the look-up table accessed by this instruction is stored on a part of level one data cache 123 configured as directly addressable memory. The look-up table set-up and operation is described below.

Look-up table set up is controlled by a set of control registers which configure the look-up tables. The first of these control registers is Look-Up Table Page Mapping Register (LTPMR). In the preferred embodiment the Look-Up Table Page Mapping Register is 32-bits. Each bit of LTPMR corresponds to one 4 KByte portion of the directly addressable memory space in level one data cache 123. When a bit in LTPMR is set (1), the corresponding 4 Kbyte page in level one data cache 123 is configured as look up table space. When a bit in LTPMR is cleared (0), the corresponding 4 Kbyte page in level one data cache 123 is not configured as look up table space. This LTPMR register configures 4 KByte regions of level one data cache 123 memory space to be treated as tables.

Figure 24:
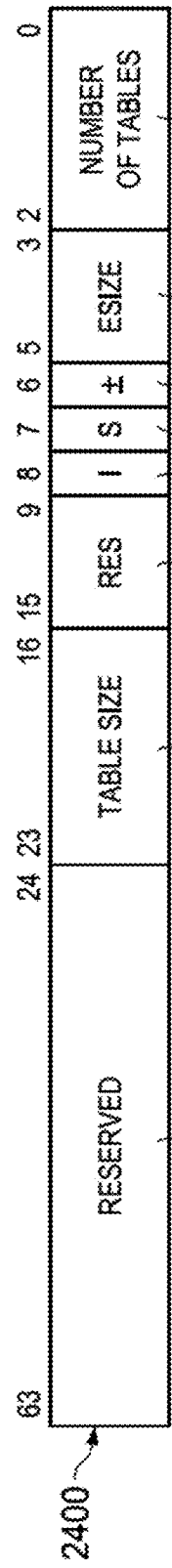
FIG. 24 illustrates the common bit encoding for each look up table control registers according to this invention.

A second of these control registers is the Look-Up Table Control Register (LTCR) illustrated in FIG. 24. In the preferred embodiment there are four Look-Up Table Control Registers (LTCR0-LTCR3) each controlling a corresponding set of look-up tables. FIG. 24 illustrates the common bit encoding 2400 for each control register LTCR0-LTCR3. Bits 23 to 64 are reserved field 2401 and not used. Bits 16 to 23 are a Table Size field 2402. These bits are preferably encoded as shown in Table 4.

TABLE 4

| Bits 16 to 23 | Table Size |
| --- | --- |
| 00 00 00 00 | 0.5K bytes |
| 00 00 00 01 | 1K bytes |
| 00 00 00 10 | 2K bytes |
| 00 00 00 11 | 4K bytes |
| 00 00 01 00 | 8K bytes |
| 00 00 01 01 | 16K bytes |
| 00 00 01 10 | 32K bytes |
| 00 00 01 11 | Reserved |
| xx xx 1x xx | Reserved |

Table 4 notes that not all possible codings of the Table Size field 2402 are meaningful. Bits 9 to 15 are reserved field 2403 and not used. Bit 8 is Interpolation field 2404. If the Interpolation field 2404 is 1, interpolation of table elements is permitted. If the Interpolation field 2404 is 0, no interpolation occurs. This is beyond the scope of this application and will not be further described. Bit 7 is Saturation field 2405. If the Saturation field 2405 is 1, then certain operations saturate the data elements. If the Saturation field 2405 is 0, no saturation occurs. Bit 6 is Signed/Unsigned field 2406. If Signed/Unsigned field 2406 is 1, the table data elements are treated a signed numbers. If Signed/Unsigned field 2406 is 0, the table data elements are treated as unsigned numbers. Bits 3 to 5 are the Element Size (ESize) field 2407. These bits are preferably encoded as shown in Table 5.

TABLE 5

| Bits 3 to 5 | Element Size |
| --- | --- |
| 000 | Byte (8 bits) |
| 001 | Half Word (16 bits) |
| 010 | Word (32 bits) |
| 011 | Reserved |
| 1xx | Reserved |

Table 5 notes that not all possible codings of the ESize field 2407 are meaningful. Note further that the Table Size field 2402 and the ESize field 2407 limit the maximum number of data elements within a table. Bits 0 to 2 are the Number of Tables field 2408. These bits are preferably encoded as shown in Table 6.

TABLE 6

| Bits 0 to 2 | Number of Parallel Look-Up tables |
| --- | --- |
| 000 | 1 Table |
| 001 | 2 Tables |
| 010 | 4 Tables |
| 011 | 8 Tables |
| 100 | 16 Tables |
| 101 to 111 | Reserved |

Table 6 notes that not all possible codings of the Element Size field 2408 are meaningful. Note further, that not all combinations of table size, element size and number of tables are compatible.

Figure 25:
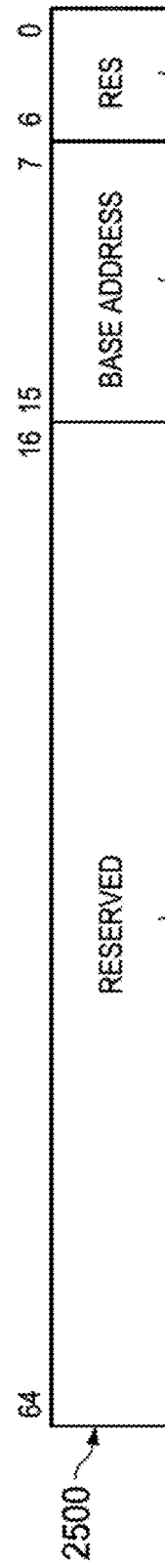
FIG. 25 illustrates the common bit encoding for each base address register according to this invention.

A third of these control registers is the Look-Up Table Base Address Register (LTBR) illustrated in FIG. 25. In the preferred embodiment there are four Look-Up Table Base Address Registers (LTBR0-LTBR3) each controlling a corresponding set of look-up tables. FIG. 25 illustrates the common bit encoding 2500 for each base address register LTBR0-LTBR3. Bits 16 to 64 are reserved field 2501 and not used. Bits 7 to 15 are a base address field 2502. Base address field 2502 is to the base address of the corresponding look-up table set. This table base address is 128-byte aligned with the seven least significant bits always read out as 0. In the preferred embodiment the cache lines of level one data cache 123 are 128 bytes. Thus the table base address always points to the beginning of a cache line in level one data cache 123.

The Look-Up Table Read instruction designates a first source register storing a table index value, a second source register storing the table set number (0 to 3) and a destination register for the returned table data. In a feasible alternate encoding of Look-Up Table Read instruction the table set number is encoded in a constant field. In accordance with the preferred embodiment the return data is 521 bits requiring a vector register. In accordance with the preferred embodiment this Look-Up Table Read instruction is performed only by D2 unit 226. A first source register stores up to 16 index values, one index value for each of the designated parallel look-up tables. These index values are stored in 256 least significant bits of the source vector register as shown in Table 7. Bits of the first source register unused according to Table 7 are ignored by the Look-Up Table Read instruction.

TABLE 7

| Index Bits | Number of Tables | | | | |
|---|---|---|---|---|---|
| | 1 | 2 | 4 | 8 | 16 |
| 0 to 15 | Index 1 | Index 1 | Index 1 | Index 1 | Index 1 |
| 16 to 31 | | | | | Index 2 |
| 32 to 47 | | | | Index 2 | Index 3 |
| 48 to 63 | | | | | Index 4 |
| 64 to 79 | | | Index 2 | Index 3 | Index 5 |
| 80 to 95 | | | | | Index 6 |
| 96 to 111 | | | | Index 4 | Index 7 |
| 112 to 127 | | | | | Index 8 |
| 128 to 143 | | Index 2 | Index 3 | Index 5 | Index 9 |
| 144 to 159 | | | | | Index 10 |
| 160 to 175 | | | | Index 6 | Index 11 |
| 176 to 191 | | | | | Index 12 |
| 192 to 207 | | | Index 4 | Index 7 | Index 13 |
| 208 to 223 | | | | | Index 14 |
| 224 to 239 | | | | Index 8 | Index 15 |
| 240 to 255 | | | | | Index 16 |

The Look-Up Table Read instruction returns data to the destination vector register as shown in Table 8.

TABLE 8

| Register Bits | Number of Tables | | | | |
|---|---|---|---|---|---|
| | 1 | 2 | 4 | 8 | 16 |
| 0 to 31 | Data 1 | Data 1 | Data 1 | Data 1 | Data 1 |
| 32 to 63 | | | | | Data 2 |
| 64 to 95 | | | | Data 2 | Data 3 |
| 96 to 127 | | | | | Data 4 |
| 128 to 159 | | | Data 2 | Data 3 | Data 5 |
| 160 to 191 | | | | | Data 6 |
| 192 to 223 | | | | Data 4 | Data 7 |
| 224 to 255 | | | | | Data 8 |
| 256 to 287 | | Data 2 | Data 3 | Data 5 | Data 9 |
| 288 to 319 | | | | | Data 10 |
| 320 to 351 | | | | Data 6 | Data 11 |
| 352 to 383 | | | | | Data 12 |
| 384 to 415 | | | Data 4 | Data 7 | Data 13 |
| 416 to 447 | | | | | Data 14 |
| 448 to 479 | | | | Data 8 | Data 15 |
| 480 to 511 | | | | | Data 16 |

In the preferred embodiment the data of each element is either sign extended or zero extended to 32 bits depending on the state of the Signed/Unsigned field 2406 of the corresponding Look-Up Table Control Registers (LTCR0-LTCR3).

Figure 26:
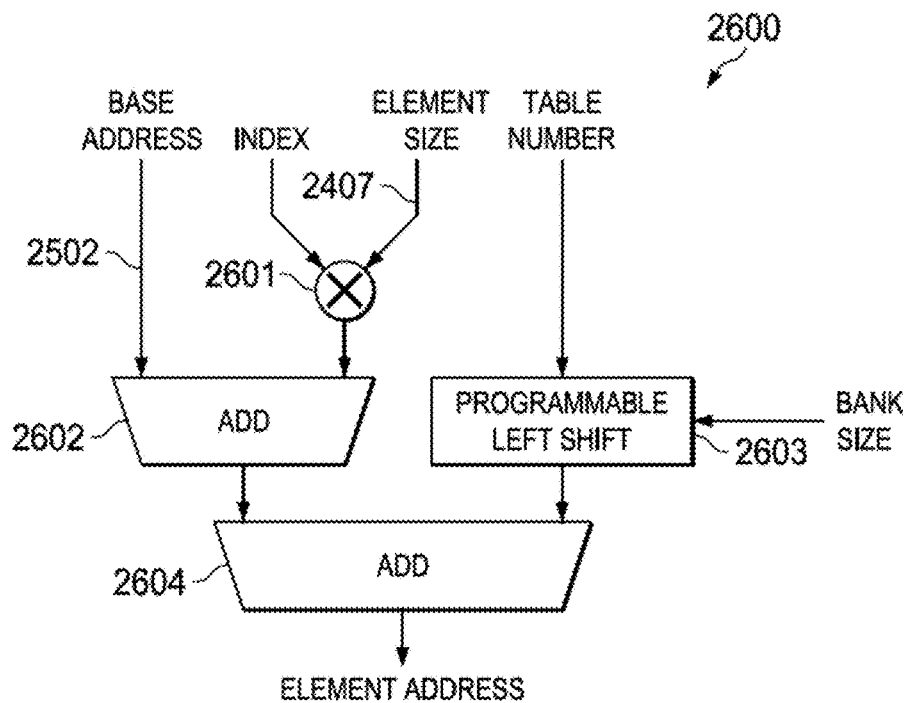
FIG. 26 illustrates an element address generator for each table in the parallel table look up instruction of this invention.

FIG. 26 illustrates element address generator 2600. In the preferred embodiment there in one address generator 2600 for each parallel look up table (Number of Tables field 2408). Element address generator 2600 receives the base address 2502, the index for the corresponding table from the first source register of the Look Up Table Read instruction, the element size (ESize field 2407). Each element address generator 2600 preferably receives an indication of the corresponding table number and a hardwired indication of the bank size used in generation of the address for the parallel tables. In this instance the table number of the first table is zero, the table number of the sixteenth table is 15. Multiplier 2601 forms the product of the corresponding table index (from the first source register according to Table 7) and the element size. This product is the element offset address. Adder 2602 adds the base address from base address field 2502 and this offset address thereby forming the element address in the first look up table. The bank size and programmable left shift 2603 form the offset for other tables. In accordance with this invention, level one instruction cache 123 is divided into 16 separately accessible banks which permit up to 16 separate and simultaneous memory access operations. As known in the art memory bank sizes are integral powers of 2 ($2^N$). This bank size is fixed upon construction of level one cache 123. Each parallel table occupies similar addresses as the first table in a separate memory bank. Programmable left shift 2603 shifts the table number by an amount corresponding to the bank size to produce the most significant bits of the addressed table element. The bank size is larger than any element offset address. Thus the output of programmable left shift consists of higher order bits that do not overlap the bits of the element address output of adder 2602. The resultant from programmable left shift 2603 is the table offset from the first table to the instant table. Adder 2604 adds the element address for the first table from adder 2602 to this table offset to produce the address of the indexed element in the particular table. Because of the non-overlap of bits, adder 2604 need merely concatenate the output of programmable left shift 2503 as most significant bits with the output of adder 2602 as least significant bits. As previously described address generator 2600 is duplicated for each table in Number of Tables field 2408.

Figure 27:
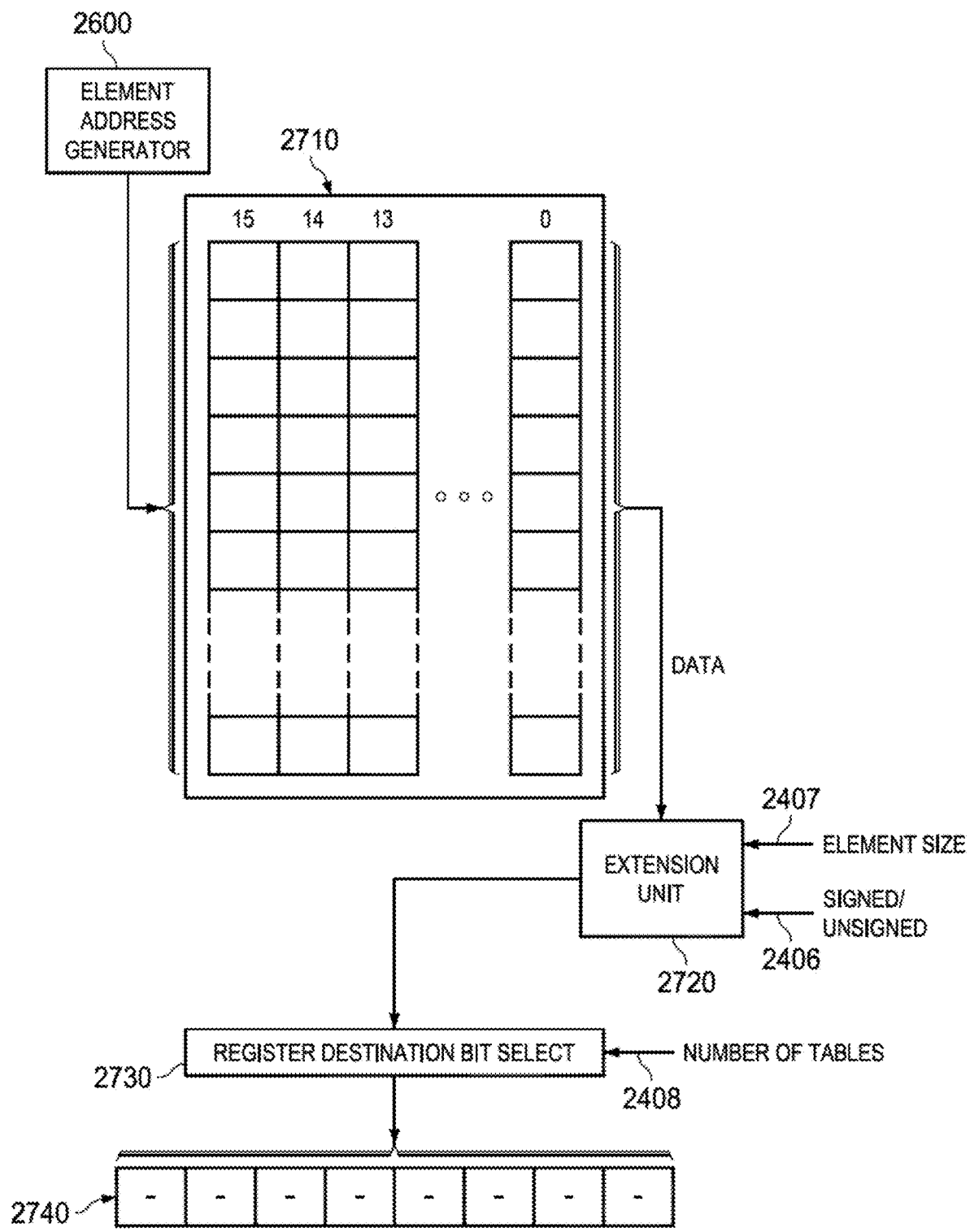
FIG. 27 schematically illustrates data transfer in response to a look up table read instruction of this invention.

FIG. 27 schematically illustrates data transfer in response to a Look Up Table Read instruction. Element address generator 2600 is as illustrated in FIG. 26. FIG. 27 illustrates only a single element address generator 2600 but there is preferably one address generator 2600 for each parallel table implemented. Memory 2710 is the portion of level one data cache 123 of the set of table of the current Look Up Table Read instruction. FIG. 27 schematically illustrates 16 tables 0 to 15, but the number of tables for any particular Look Up Table Read instruction is set by the Number of Tables field 2408. The address from an element address generator 2600 corresponding to a particular table accesses one element in a corresponding table of memory 2710. This data is recalled from memory 2710 and supplied to extension unit 2720. Extension unit 2720 also receives the Element Size from ESize field 2407 and the Signed/Unsigned indication from Signed/Unsigned field 2406. Extension unit 2720 either sign extends or zero extends the data element to 32 bits as previously described. The extended data is supplied to Register Destination Bits Select 2730. Register Destination Bits Select 2730 also receives the number of tables from field 2408. Register Destination Bits Select 2730 steers the extended data to the portion of destination register 2740 corresponding to the particular table and number of tables as described in conjunction with Table 8. FIG. 27 illustrates destination register 2740 having only 8 slots. This is merely for clarity of illustration, the actual number and arrangement of slots is in accordance with Table 8.

Figure 28:
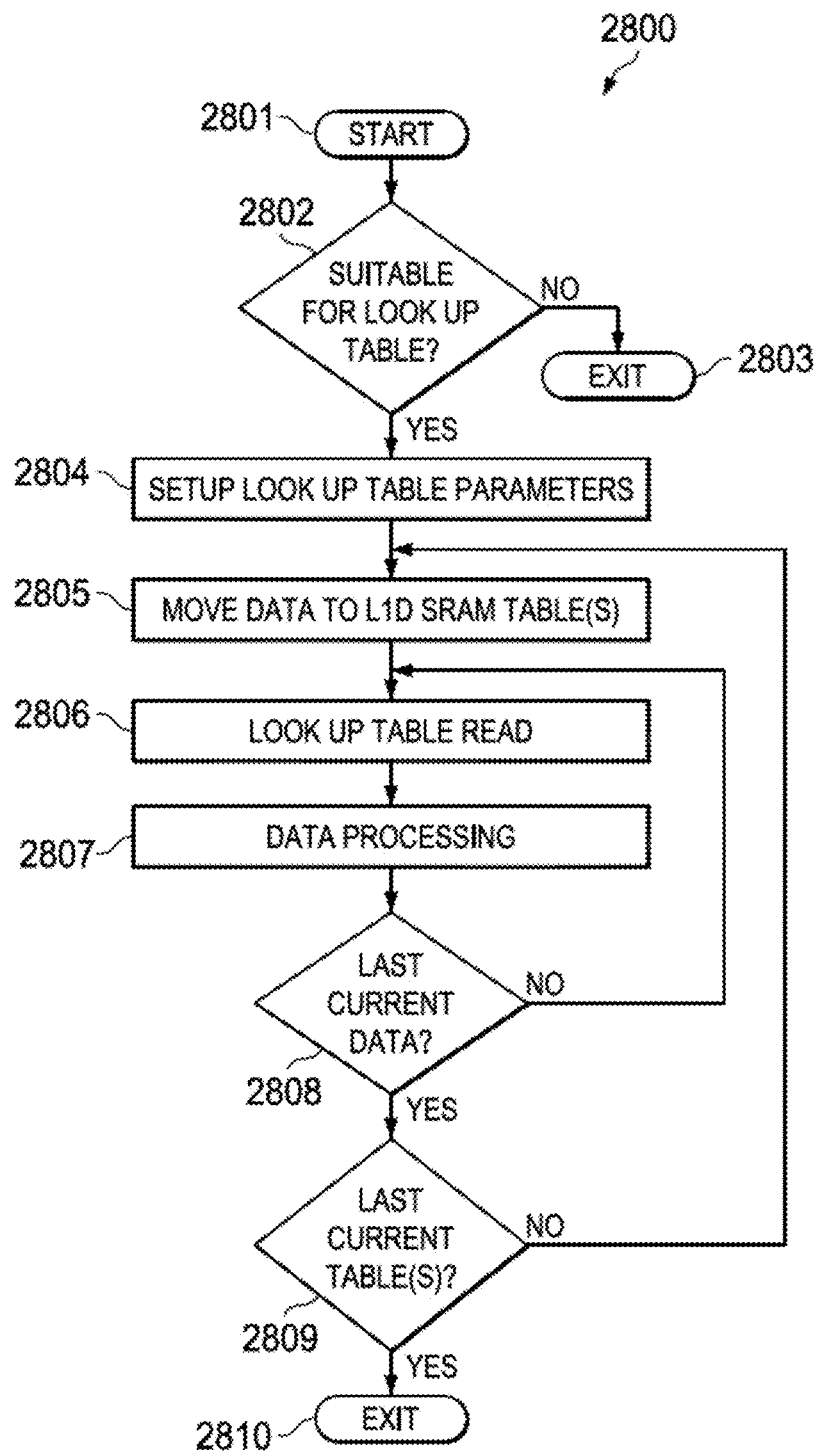
FIG. 28 illustrates the process of applying the look up table read instruction of this invention to a random access data pattern.

FIG. 28 illustrates process 2800 of this invention. Process 2800 begins with start block 2801. Decision block 2802 determines if the current algorithm is suitable for the look up table technique of this invention. As previously described this look up table technique may be useful for certain data access patterns. The object of this invention is to enable vector SIMD processing as much as possible. Setting up a look up table includes the overhead described above. Depending on the data access pattern, this invention may be useful. This invention is most useful for data access patterns that dense (data elements are taken from a limited address range) and irregular. As will be further explained below, this invention is most useful if data access is generally confined within data sets that can be stored in one table. If the data accesses are too sparse, such that plural accessed data elements are not generally within a span of one table, this invention may not be advantageous. Another consideration is the number and frequency of off pattern data accesses, that is, data accesses that cannot be included within the look up tables. Using part of level one data cache 123 reduces the amount of memory that can be used for cache. If the data access of the algorithm is confined within sets that can be stored as table, losing cache capacity may be inconsequential. If the algorithm includes extensive data access that cannot be stored in tables, the loss on cache capacity may reduce overall performance. Decision block 2802 determines if the current algorithm is suitable for this invention. If not (No at decision block 2802), then process 2800 exits via exit block 2803. If so (Yes at decision block 2802), the process 2800 proceeds.

Processing block 2804 performs the look up table parameter set up. This involves selection of the look up table parameters appropriate for the data access pattern of the algorithm. The element size (ESize field 2407) is selected corresponding to the data size of the algorithm. This element size should be at least as large as the data size of the algorithm. The number of tables (Number of Tables field 2408) might be selected based upon the relationship between the element size and the width of a vector register. Vector SIMD operations are most effective when all slots in the vector are filled. According to Table 8 sixteen tables permits 16 elements of up to 32 bits. In other cases the algorithm may employ larger data widths of variables other than those recalled from the look up tables. The number of tables and thus the number of recalled elements should be selected accordingly. The table size (Table Size field 2402) should be selected based upon the data access pattern f the algorithm. This invention is most advantageous for data access patterns than are irregular but generally confined to a small data block. The table size should be selected in view of the data access dispersion to permit each look up table read instruction to fill every slot of the destination vector register. This would tend to require larger look up tables. Larger look up tables reduce the amount of level one data cache 123 memory available to be used as cache. Thus the look up table size is limited by the desirability of providing more level one data cache. The nature of other data accesses of the algorithm other than the look up table accesses determines the value of more or less level one data cache. The result of processing block 2804 is properly programmed Look-Up Table Page Mapping Register (LTPMR), Look-Up Table Control Registers (LTCR0-LTCR3) and Look-Up Table Base Address Registers (LTBR0-LTBR3).

Process block 2805 moves data to the just established look up tables. The manner of this data movement depends upon the location of the data. In many cases the algorithm will be operating upon data received via a communication channel. This data is typically stored in main memory. Generally the best means of data transfer is via a direct memory access (DMA) from the main memory storage location to the part of level one data cache 123 designated for look up tables. This would typically take full advantage of the memory transfer channel between level one data cache 123 and the main memory. Such a DMA data transfer operates autonomously of central processing unit 110, not requiring constant CPU attention.

Figure 29:
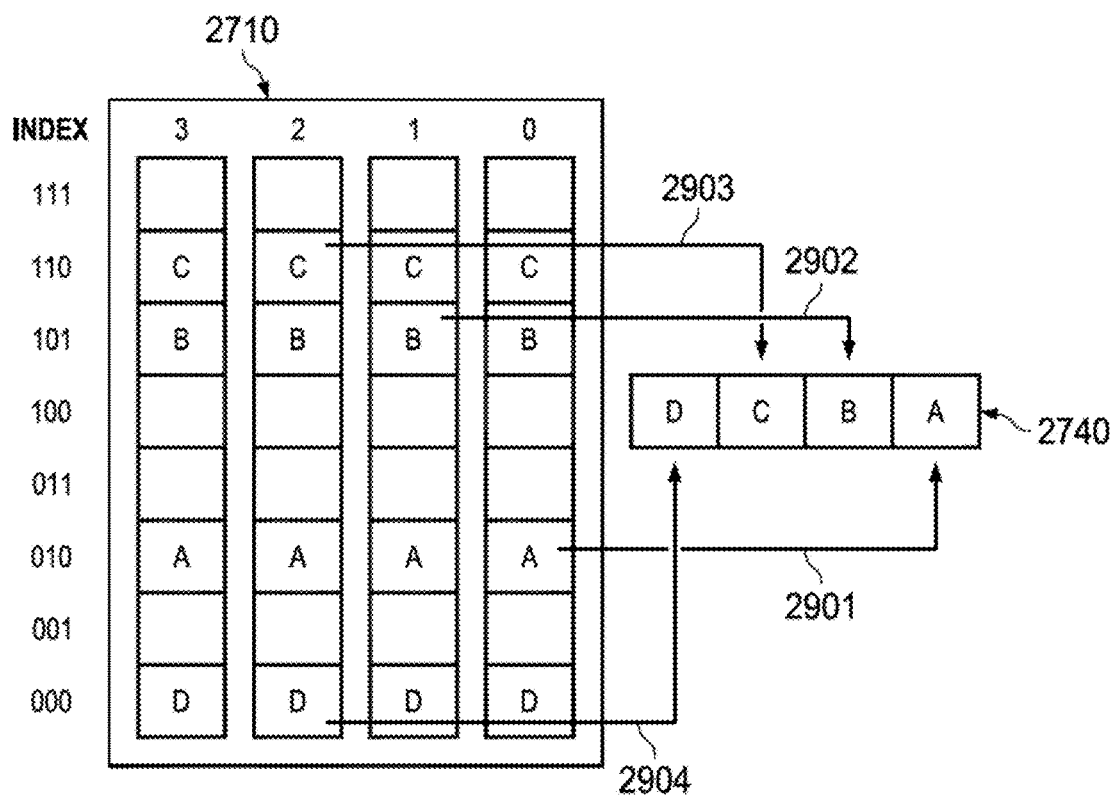
FIG. 29 illustrates details of an example of a vector register loaded using a look up table read instruction in accordance with this invention.

Process block 2806 performs a look up table read instruction to load data into a destination register. FIG. 29 illustrates this process. In FIG. 29 an example of memory 2710 is loaded in accordance with this invention. In this example memory 2710 includes 4 tables 0 to 3. This selection of four tables is in accordance with the data in Number of Tables field 2408 in the corresponding Look-Up Table Control Register (LTCR0-3). Each table 0 to 3 includes the same data. As noted in FIG. 29 the desired data for destination register 2740 is d:c:b:a (using a big endian format). FIG. 29 illustrates four data transfers 2901, 2902, 2903 and 2904 to load destination register 2740 from memory 2710. Each table stores data -:c:b:-:-:a:-:d, where "-" indicates data not relevant to this look up table read. FIG. 29 illustrates index values assigned to each table entry. FIG. 29 shows a 3-bit index for 8 table entries as an example of the processes for the preferable 16-bit table index values for 65,536 table entries. Each of the four data transfers 2901, 2902, 2903 and 2904 are in response to a corresponding index value in a source register of the look up table read instruction as shown in Table 7. A "010" index value causes data transfer 2901. A "101" index value causes data transfer 2902. A "110" index value causes data transfer 2903. A "000" index value causes data transfer 2904. The source register is loaded with these index values 010:101:110:000 to simultaneously make the four data transfers 2901, 2901, 2903 and 2904 to destination register 2740. According to the description in conjunction with Table 7 the index values in the index source register are as shown in Table 9.

TABLE 9

| Index Register Bits | Data |
| --- | --- |
| 0 to 15 | 0000 0000 0000 0010 |
| 16 to 31 | xxxx xxxx xxxx xxxx |
| 32 to 47 | xxxx xxxx xxxx xxxx |
| 48 to 63 | xxxx xxxx xxxx xxxx |
| 64 to 79 | 0000 0000 0000 0101 |
| 80 to 95 | xxxx xxxx xxxx xxxx |
| 96 to 111 | xxxx xxxx xxxx xxxx |
| 112 to 127 | xxxx xxxx xxxx xxxx |
| 128 to 143 | 0000 0000 0000 0110 |
| 144 to 159 | xxxx xxxx xxxx xxxx |
| 160 to 175 | xxxx xxxx xxxx xxxx |
| 176 to 191 | xxxx xxxx xxxx xxxx |
| 192 to 207 | 0000 0000 0000 0000 |
| 208 to 223 | xxxx xxxx xxxx xxxx |
| 224 to 239 | xxxx xxxx xxxx xxxx |
| 240 to 255 | xxxx xxxx xxxx xxxx |

Note that "x" indicates a don't care value, the operation is the same regardless of the data at these locations. The most significant bits 256 to 511 are also don't care values.

Process block 2807 performs data processing on the data read by the look up table read. In accordance with this invention this preferably includes at least one vector SIMD operation taking advantage of the packed data on the look up table read. The exact nature of this data processing depends upon the base algorithm and is beyond the scope of this invention.

Decision block 2808 determines whether the base algorithm is finished with the current data in the look up tables. This invention can employed most effectively if there are plural data accesses implemented by the look up table instruction within a reasonably compact data block. If another look up table read within the same data is possible (No at decision block 2808), then process 2800 proceeds to process block 2806 to employ a look up table read to access additional data.

If another look up table read within the same data is not possible (Yes at decision block 2820), then process 2800 proceeds to decision block 2809. Decision block 2809 determines whether the base algorithm is finished with the current look up tables parameters. If this is not the case (No at decision block 2809), then the current algorithm may be applied to new data with the existing table parameters. This would be the case where the data set of the algorithm is larger than the tables implemented. In this case the data in the tables is no longer in use (Yes at decision block 2808) but the table parameters are reusable (No at decision block 2809), then process 2800 proceeds to processing block 2806 to store new data in memory 2710. This new data would be stored in tables having the same dimensions as the prior tables. Process 2800 then advances to process block 2807, decision block 2808 and repeats decision block 2809.

If the algorithm can no longer use the same table parameters (Yes at decision block 2809), then process 2800 ends with exit block 2810. It may be possible for the algorithm to advantageously perform other data accesses using look up table read instructions with differing table parameters. In that case process 2800 should be re-entered via start block 2801 and proceed with the suitability determination of decision block 2802.

This invention addresses the problem of random memory access patterns by setting up of parallel look up tables and using a parallel look up table read instruction to perform a vector load capable. This look up table read vector load uses the whole load bandwidth. A traditional look up table avoids certain complex computations such as trigonometric functions. In the traditional use the index corresponds to the function argument and the data in the look up table is the corresponding function value. In this invention a portion of the data itself is stored in parallel look up tables. This invention differs from the traditional use because the data is dynamic in nature. This could be, for example, multiple sections of an image and with many such images in a video. Thus this invention differs from the typical look up table use. This invention uses parallel look up tables to solve the problem of random read access.

The novelty of this invention's use of parallel look up tables is the following. Setting up parallel LUT is simple. Sequential data is written into parallel tables using either a vector store instruction or a parallel look up table write instruction. In this invention a large number of read accesses outweighs the overhead of setting up the look up tables. Setting up the look up tables in this invention table is thus an initialization operation. A parallel look up table read instruction effectively parallelizes the random access pattern.

The invention has the following advantages. Read access for random access patterns are fully parallelized making full use of load bandwidth of Vector SIMD. Only a single memory access for a vector performs the data transfer of multiple scalar loads required by the prior art. This invention needs no instruction cycles to re-arrange data. This invention is advantageous if the number of random read accesses outweighs heavily the cost of setting up the look up tables for the data block. The data block should be reasonably sized such that the parallel look up tables do not result in huge memory cost. This is the kind of problem of the ORB algorithm where the performance gain of this invention outweighs the performance degradation of look up table setup cost and memory cost.

Random/non-sequential access patterns are becoming common in machine vision algorithms. Vector SIMD operations are efficient solutions to vision algorithms because typically same operation is repeated over an entire image. The parallel look up table use of this invention for random access patterns can be advantageous in terms of computation complexity and speed.

What is claimed is:

1. A system, comprising:
   a cache memory that includes a portion configured to store data arranged as tables; and
   a processor configured to:
   cause a set of data elements to be stored in the portion of the cache memory so as to generate a set of tables, wherein each table includes a respective copy of the set of data elements; and
   execute a look-up table read instruction, including:
   accessing a respective data element of the set of data elements from each of the set of tables in parallel; and
   causing the respective data elements from the set of tables to be stored in sequential order to form a vector.

2. The system of claim 1, wherein the look-up table read instruction specifies a register storing a table index value, and wherein the processor is configured to access the respective data element of the set of data elements from each of the set of tables based on the table index value.

3. The system of claim 1, wherein the look-up table read instruction specifies a register storing a value indicating a number of tables in the set of tables.

4. The system of claim 1, wherein the look-up table read instruction specifies a vector destination register, and wherein the processor is configured to cause the respective data elements from the set of tables to be stored in sequential order in the vector destination register to form the vector.

5. The system of claim 1, wherein prior to the set of data elements to be stored in the portion of the cache memory, the set of data elements is stored in a memory, and wherein at least some of the data elements are not adjacent to each other in the memory.

6. The system of claim 1, wherein the processor is further configured to execute a single instruction multiple data (SIMD) instruction on the formed vector.

7. The system of claim 1, wherein the cache memory is a level one (L1) data cache memory, and wherein the portion of the L1 data cache memory is configured to be a directly addressable memory.

8. The system of claim 1, further comprising a register configured to store a set of values, each corresponding to a sub-portion of the portion of the cache memory, and wherein each value of the set of values specifies whether or not the corresponding sub-portion is configured to store a table.

9. The system of claim 1, further comprising a register configured to store a value that specifies a size of each of the set of tables.

10. A method, comprising:
    causing, by a processor of a device, a set of data elements to be stored in a portion of a cache memory to generate a set of tables, wherein each table includes a respective copy of the set of data elements; and
    executing, by the processor, a look-up table read instruction, including:
    accessing a respective data element of the set of data elements from each of the set of tables in parallel; and
    causing the respective data elements from the set of tables to be stored in sequential order to form a vector.

11. The method of claim 10, wherein the look-up table read instruction specifies a register storing a table index value, and wherein accessing the respective data element of the set of data elements from each of the set of tables comprises accessing the respective data element of the set of data elements from each of the set of tables based on the table index value.

12. The method of claim 10, wherein the look-up table read instruction specifies a register storing a value indicating a number of tables in the set of tables.

13. The method of claim 10, wherein the look-up table read instruction specifies a vector destination register, and wherein causing the respective data elements from the set of tables to be stored in sequential order to form the vector comprises causing the respective data elements from the set of tables to be stored in sequential order in the vector destination register to form the vector.

14. The method of claim 10, wherein prior to the set of data elements to be stored in the portion of the cache memory, the set of data elements is stored in a memory, and wherein at least some of the data elements are not adjacent to each other in the memory.

15. The method of claim 10, further comprising executing a single instruction multiple data (SIMD) instruction on the formed vector.

16. The method of claim 10, wherein the cache memory is a level one (L1) data cache memory, and wherein the portion of the L1 data cache memory is a directly addressable memory.

17. The method of claim 10, wherein the device comprises a register that stores a set of values, each corresponding to a sub-portion of the portion of the cache memory, and wherein each value of the set of values specifies whether or not the corresponding sub-portion is configured to store a table.

18. The method of claim 10, wherein the device comprises a register that stores a value specifying a size of each of the set of tables.

19. A device, comprising:

a first memory configured to store a set of data elements;

a second memory that includes a portion configured to store data arranged as a set of tables; and a processor configured to:

cause the set of data elements to be copied from the first memory to the portion of the second memory so as to generate a set of tables, wherein each table includes a respective copy of the set of data elements; and execute a look-up table read instruction, including:

accessing a respective data element of the set of data elements from each of the set of tables in parallel; and causing the respective data elements from the set of tables to be stored in sequential order to form a vector.

20. The device of claim 19, wherein the look-up table read instruction specifies a first register storing a table index value, a second register storing a value indicating a number of tables in the set of tables, and a vector destination register, wherein the processor is configured to access the respective data element of the set of data elements from each of the set of tables based on the table index value, and wherein the processor is configured to cause the respective data elements from the set of tables to be stored in sequential order in the vector destination register to form the vector.

* * * * *